(12) United States Patent
Graziosi et al.

(10) Patent No.: US 10,244,223 B2
(45) Date of Patent: Mar. 26, 2019

(54) METHODS FOR FULL PARALLAX COMPRESSED LIGHT FIELD 3D IMAGING SYSTEMS

(71) Applicant: Ostendo Technologies, Inc., Carlsbad, CA (US)

(72) Inventors: Danillo B. Graziosi, Carlsbad, CA (US); Zahir Y. Alpaslan, San Marcos, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 741 days.

(21) Appl. No.: 14/591,743

(22) Filed: Jan. 7, 2015

(65) Prior Publication Data

US 2015/0201176 A1    Jul. 16, 2015

Related U.S. Application Data

(60) Provisional application No. 61/926,069, filed on Jan. 10, 2014.

(51) Int. Cl.
*H04N 13/139* (2018.01)
*H04N 13/128* (2018.01)
(Continued)

(52) U.S. Cl.
CPC ......... *H04N 13/139* (2018.05); *H04N 13/111* (2018.05); *H04N 13/128* (2018.05);
(Continued)

(58) Field of Classification Search
CPC ........... H04N 13/0011; H04N 13/0022; H04N 13/0029; H04N 13/0048; H04N 13/0059;
(Continued)

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| WO | WO-2011/065738 | 6/2011 |
| WO | WO-2013/049699 | 4/2013 |

OTHER PUBLICATIONS

Marcus Magnor, Data Compression for Light-Field Rendering, Apr. 3, 2000.*

(Continued)

*Primary Examiner* — Md N Haque
(74) *Attorney, Agent, or Firm* — Womble Bond Dickinson (US) LLP

(57) ABSTRACT

A compressed light field imaging system is described. The light field 3D data is analyzed to determine optimal subset of light field samples to be (acquired) rendered, while the remaining samples are generated using multi-reference depth-image based rendering. The light field is encoded and transmitted to the display. The 3D display directly reconstructs the light field and avoids data expansion that usually occurs in conventional imaging systems. The present invention enables the realization of full parallax 3D compressed imaging system that achieves high compression performance while minimizing memory and computational requirements.

13 Claims, 13 Drawing Sheets

(51) Int. Cl.
| | |
|---|---|
| *H04N 13/161* | (2018.01) |
| *H04N 13/194* | (2018.01) |
| *H04N 13/172* | (2018.01) |
| *H04N 13/243* | (2018.01) |
| *H04N 13/271* | (2018.01) |
| *H04N 13/275* | (2018.01) |
| *H04N 19/597* | (2014.01) |
| *H04N 19/436* | (2014.01) |
| *H04N 13/111* | (2018.01) |
| *H04N 13/00* | (2018.01) |

(52) U.S. Cl.
CPC ......... *H04N 13/161* (2018.05); *H04N 13/172* (2018.05); *H04N 13/194* (2018.05); *H04N 13/243* (2018.05); *H04N 13/271* (2018.05); *H04N 13/275* (2018.05); *H04N 19/436* (2014.11); *H04N 19/597* (2014.11); *H04N 2013/0074* (2013.01)

(58) Field of Classification Search
CPC ........... H04N 13/0062; H04N 13/0242; H04N 13/0271; H04N 13/0275; H04N 19/436; H04N 19/597; H04N 2013/0074
See application file for complete search history.

(56) References Cited

U.S. PATENT DOCUMENTS

| | | | |
|---|---|---|---|
| 6,097,394 A | 8/2000 | Levoy et al. | |
| 6,738,533 B1 | 5/2004 | Shum et al. | |
| 6,963,431 B2 | 11/2005 | Holzbach et al. | |
| 7,404,645 B2 | 7/2008 | Margulis | |
| 7,623,560 B2 | 11/2009 | El-Ghoroury et al. | |
| 7,767,479 B2 | 8/2010 | El-Ghoroury et al. | |
| 7,829,902 B2 | 11/2010 | El-Ghoroury et al. | |
| 7,978,407 B1 | 7/2011 | Connor | |
| 8,049,231 B2 | 11/2011 | El-Ghoroury et al. | |
| 8,098,265 B2 | 1/2012 | El-Ghoroury et al. | |
| 8,155,456 B2 | 4/2012 | Babacan et al. | |
| 8,243,770 B2 | 8/2012 | El-Ghoroury et al. | |
| 8,284,237 B2 | 10/2012 | Chen et al. | |
| 8,401,316 B2 | 3/2013 | Babacan et al. | |
| 8,567,960 B2 | 10/2013 | El-Ghoroury et al. | |
| 8,681,185 B2 | 3/2014 | Guncer | |
| 8,854,724 B2 | 10/2014 | El-Ghoroury et al. | |
| 8,928,969 B2 | 1/2015 | Alpaslan et al. | |
| 8,970,646 B2 | 3/2015 | Guncer | |
| 9,129,183 B2 | 9/2015 | Venkataraman et al. | |
| 9,179,126 B2 | 11/2015 | El-Ghoroury et al. | |
| 9,195,053 B2 | 11/2015 | El-Ghoroury et al. | |
| 9,524,682 B2 | 12/2016 | El-Ghoroury et al. | |
| 9,681,069 B2 | 6/2017 | El-Ghoroury et al. | |
| 9,712,764 B2 | 7/2017 | El-Ghoroury et al. | |
| 9,769,365 B1 | 9/2017 | Jannard | |
| 2002/0067521 A1 | 6/2002 | Holzbach et al. | |
| 2008/0043095 A1 | 2/2008 | Vetro et al. | |
| 2008/0043096 A1* | 2/2008 | Vetro | H04N 19/597 348/51 |
| 2009/0086170 A1 | 4/2009 | El-Ghoroury et al. | |
| 2009/0268970 A1 | 10/2009 | Babacan et al. | |
| 2009/0278998 A1 | 11/2009 | El-Ghoroury et al. | |
| 2010/0003777 A1 | 1/2010 | El-Ghoroury et al. | |
| 2010/0007804 A1 | 1/2010 | Guncer | |
| 2010/0046848 A1 | 2/2010 | Witzgall | |
| 2010/0066921 A1 | 3/2010 | El-Ghoroury et al. | |
| 2010/0091050 A1 | 4/2010 | El-Ghoroury et al. | |
| 2010/0156894 A1 | 6/2010 | Holler et al. | |
| 2010/0220042 A1 | 9/2010 | El-Ghoroury et al. | |
| 2010/0225679 A1 | 9/2010 | Guncer | |
| 2010/0231585 A1 | 9/2010 | Weiblen | |
| 2010/0265385 A1 | 10/2010 | Knight et al. | |
| 2010/0309287 A1 | 12/2010 | Rodriguez | |
| 2011/0058021 A1 | 3/2011 | Chen et al. | |
| 2011/0134227 A1 | 6/2011 | Shin | |
| 2011/0255592 A1 | 10/2011 | Sung et al. | |
| 2012/0033113 A1 | 2/2012 | El-Ghoroury et al. | |
| 2012/0050481 A1 | 3/2012 | Chen et al. | |
| 2012/0069154 A1 | 3/2012 | Talstra et al. | |
| 2012/0105310 A1 | 5/2012 | Sverdrup et al. | |
| 2012/0183232 A1 | 7/2012 | Babacan et al. | |
| 2012/0213094 A1 | 8/2012 | Baraniuk et al. | |
| 2012/0309455 A1 | 12/2012 | Klose et al. | |
| 2012/0327139 A1 | 12/2012 | Margulis | |
| 2013/0010057 A1 | 1/2013 | Borel et al. | |
| 2013/0077880 A1* | 3/2013 | Venkataraman | G06T 9/00 382/232 |
| 2013/0077882 A1 | 3/2013 | Venkataraman et al. | |
| 2013/0141895 A1 | 6/2013 | Alpaslan et al. | |
| 2013/0222633 A1 | 8/2013 | Knight et al. | |
| 2013/0258451 A1 | 10/2013 | El-Ghoroury et al. | |
| 2013/0282639 A1 | 10/2013 | Potkonjak | |
| 2013/0286053 A1 | 10/2013 | Fleck et al. | |
| 2013/0286178 A1 | 10/2013 | Lewis et al. | |
| 2013/0321581 A1 | 12/2013 | El-Ghoroury et al. | |
| 2013/0342644 A1* | 12/2013 | Rusanovskyy | H04N 19/597 348/43 |
| 2014/0002675 A1 | 1/2014 | Duparre et al. | |
| 2014/0079336 A1 | 3/2014 | Venkataraman et al. | |
| 2014/0092281 A1 | 4/2014 | Nisenzon et al. | |
| 2014/0098189 A1* | 4/2014 | Deng | H04N 19/176 348/43 |
| 2014/0146201 A1 | 5/2014 | Knight et al. | |
| 2014/0168062 A1 | 6/2014 | Katz et al. | |
| 2014/0210823 A1 | 7/2014 | Maguire, Jr. | |
| 2014/0219558 A1 | 8/2014 | Teng et al. | |
| 2014/0232822 A1 | 8/2014 | Venkataraman et al. | |
| 2014/0285429 A1 | 9/2014 | Simmons | |
| 2014/0292620 A1 | 10/2014 | Lapstun | |
| 2014/0340434 A1 | 11/2014 | El-Ghoroury et al. | |
| 2014/0347361 A1 | 11/2014 | Alpaslan et al. | |
| 2014/0375856 A1 | 12/2014 | Kaneko | |
| 2015/0033539 A1 | 2/2015 | El-Ghoroury et al. | |
| 2015/0201176 A1 | 7/2015 | Graziosi et al. | |
| 2015/0264223 A1 | 9/2015 | Akenine-Moller et al. | |
| 2015/0312560 A1 | 10/2015 | Deering et al. | |
| 2016/0021355 A1 | 1/2016 | Alpaslan et al. | |
| 2016/0028935 A1 | 1/2016 | El-Ghoroury et al. | |
| 2016/0182782 A1 | 6/2016 | El-Ghoroury et al. | |
| 2016/0191765 A1 | 6/2016 | El-Ghoroury et al. | |
| 2016/0191823 A1 | 6/2016 | El-Ghoroury et al. | |
| 2016/0360177 A1 | 12/2016 | Graziosi et al. | |
| 2017/0184776 A1 | 6/2017 | El-Ghoroury et al. | |
| 2017/0264879 A1 | 9/2017 | Zhou | |

OTHER PUBLICATIONS

Iwadate, Yuichi, et al., "Generating Integral Image from 3D Object by Using Oblique Projection", *18th International Display Workshops 2011 (IDW '11)*, vol. 1, (Dec. 7-9, 2011), pp. 269-272.
"Invitation to Pay Additional Search Fees dated Sep. 22, 2017; European Patent Application No. 15701079.4", dated Sep. 22, 2017.
"International Search Report and Written Opinion of the International Searching Authority dated Dec. 14, 2015; International Application No. PCT/US2015/040457", (dated Dec. 14, 2015).
"Office Action dated May 15, 2017; Chinese Patent Application No. 201580012959.X", (dated May 15, 2017).
Alpaslan, Zahir Y., et al., "Development and Deployment of a Tiled Full Parallax Light Field Display System", *Proceedings of the SPIE, Applications of Digital Image Processing XXXIX*, vol. 9971, (Sep. 27, 2016), pp. 99710J-1 to 99710J-8.
Alpaslan, Zahir Y., et al., "Parametric Characterization of Perceived Light Field Display Resolution", *SID Symposium Digest of Technical Papers*, vol. 47, No. 1, (May 2016), pp. 1241-1245.
Arai, Jun , "Three-Dimensional Television System Based on Spatial Imaging Method Using Integral Photography", *International Conference on Acoustics, Speech, and Signal Processing (ICASSP) 2012*, (May 7-9, 2012), pp. 5449-5452.
Balogh, Tibor , "The HoloVizio System", *Stereoscopic Displays and Virtual Reality Systems XIII, Proceedings of the SPIE-IS&T Electronic Imaging*, vol. 6011, (Jan. 27, 2006), pp. 60550U-1 to 60550U-12.

(56) References Cited

OTHER PUBLICATIONS

Bhaskaran, Vasudev, "65.1: Invited Paper: Image/Video Compression—A Display Centric Viewpoint", *SID Symposium Digest of Technical Papers*, vol. 38, No. 1, (2008), pp. 990-993.
Cakmakci, Ozan, et al., "Head-Worn Displays: A Review", *Journal of Display Technology*, vol. 2, No. 3, (Sep. 2006), pp. 199-216.
Chen, Jianhong, et al., "True Color Optical Simulation of Integral Imaging 3D Display", *Proceedings of the International Display Workshops*, vol. 21, (Dec. 3, 2014), pp. 848-851.
Conti, Caroline, et al., "Spatial Prediction Based on Self-Similarity Compensation for 3D Holoscopic Image and Video Coding", *2011 18th IEEE International Conference on Image Processing (ICIP)*, (Sep. 11-14, 2011), pp. 961-964.
El-Ghoroury, Hussein S., et al., "Quantum Photonic Imager (QPI): A Novel Display Technology that Enables more than 3D Applications", *SID Symposium Digest of Technical Papers*, vol. 46, No. 1, (May 2015), pp. 371-374.
Furihata, Hisayoshi, et al., "Novel view synthesis with residual error feedback for FTV", *Stereoscopic Displays and Applications XXI, Proceedings of the SPIE-IS&T Electronic Imaging*, vol. 7542, (Jan. 2010), pp. 75240K-1 to 75240K-12.
Gortler, Steven J., et al., "The Lumigraph", *Proceedings of the 23rd Annual Conference on Computer Graphics and Interactive Techniques (SIGGRAPH '96)*, (1996), pp. 43-52.
Graziosi, Danillo B., et al., "Compression for Full-Parallax Light Field Displays", *Proceedings of SPIE—The International Society for Optical Engineering*, (Feb. 2014), 14 pp. total.
Graziosi, Danillo B., et al., "Depth assisted compression of full parallax light fields", *Stereoscopic Displays and Applications XXVI, Proceedings of SPIE-IS&T Electronic Imaging*, vol. 9391, (Mar. 17, 2015), pp. 93910Y-1 to 93910Y-15.
Guenter, Brian, et al., "Foveated 3D Graphics", *ACM SIGGRAPH Asia*, (Nov. 2012), 10 pp. total.
Halle, Michael W., et al., "Fast computer graphics rendering for full parallax spatial displays", *Proc. SPIE 3011, Practical Holography XI and Holographic Materials III* (Apr. 10, 1997), 8 pp. total.
Holliman, Nicolas S., et al., "Three-Dimensional Displays: A Review and Applications Analysis", *IEEE Transactions on Broadcasting*, vol. 57, No. 2, (Jun. 2011), pp. 362-371.
Hu, Xinda, et al., "Design and Assessment of a Depth-Fused Multi-Focal-Plane Display Prototype", *Journal of Display Technology*, vol. 10, No. 4, (Apr. 2014), pp. 308-316.
Hua, Hong, et al., "A 3D integral imaging optical see-through head-mounted display", *Optics Express*, vol. 22, No. 11, (May 28, 2014), pp. 13484-13491.
Isaksen, Aaron, et al., "Dynamically Reparameterized Light Fields", *Proceedings of the 27th Annual Conference on Computer Graphics and Interactive Techniques (SIGGRAPH '00)*, (2000), pp. 297-306.
Iwasawa, Shoichiro, et al., "REI: an automultiscopic projection display", *Proceedings of 3DSA2013, Selected paper 1*, (2013), pp. 1-4.
Jang, Jae-Young, et al., "3D Image Correlator using Computational Integral Imaging Reconstruction Based on Modified Convolution Property of Periodic Functions", *Journal of the Optical Society of Korea*, vol. 18, No. 4, (Aug. 2014), pp. 388-394.
Javidi, Bahram, et al., "Three-Dimensional Holographic Image Sensing and Integral Imaging Display", *Journal of Display Technology*, vol. 1, No. 2, (Dec. 2005), pp. 341-346.
Kim, Changil, "Scene Reconstruction from a Light Field", https://graphics.ethz.ch/~kimc/publications/changil-kim-ms-thesis-2010-compressed.pdf, (2010), 72 pp. total.
Koike, T., "Theory, Design, and Application of 4-D Light Field Display", *Ph.D. Dissertation, University of Tokyo*, (Mar. 23, 2009), 133 pp. total.
Kundu, Shinjini, "Light Field Compression Using Nomography and 2D Warping", *2012 IEEE International Conference on Acoustics, Speech and Signal Processing (ICASSP)*, (Mar. 25-30, 2012), pp. 1349-1352.

Lanman, Douglas, et al., "Near-Eye Light Field Displays", *ACM Transactions on Graphics (TOG)*, vol. 32, Issue 6, Article 220, (Nov. 2013), 27 pp. total.
Liu, Shujie, et al., "New Depth Coding Techniques With Utilization of Corresponding Video", *IEEE Transactions on Broadcasting*, vol. 57, No. 2, (Jun. 2011), pp. 551-561.
Maimone, Andrew, et al., "Computational Augmented Reality Eyeglasses", *2013 IEEE International Symposium on Mixed and Augmented Reality (ISMAR)*, (Oct. 1-4, 2013), pp. 29-38.
Marwah, Kshitij, et al., "Compressive Light Field Photography using Overcomplete Dictionaries and Optimized Projections", *Proc. of SIGGRAPH 2013 (ACM Transactions on Graphics, 32, 4)*, (2013), 12 pp. total.
Masia, Belen, et al., "A survey on computational displays: Pushing the boundaries of optics, computation, and perception", *Computers & Graphics*, vol. 37, (2013), pp. 1012-1038.
Matsubara, Rie, et al., "Light field display simulation for light field quality assessment", *Proceedings of the Stereoscopic Displays and Applications Conference XXVI (SPIE-IS&T)*, vol. 9391, (Feb. 9-11, 2015), pp. 93910G-1 to 93910G-15.
Microsoft, "Microsoft HoloLens", downloaded from https://www.microsoft.com/en-us/hololens, (admitted prior art), 5 pp. total.
Morvan, Yannick, et al., "Platelet-based coding of depth maps for the transmission of multiview images", *Proceedings of the SPIE, Stereoscopic Displays and Applications*, vol. 6055, (Feb. 2006), 12 pp. total.
Ng, Ren, "Fourier Slice Photography", *ACM Trans. Graph.*, vol. 24, No. 3, (Jul. 2005), pp. 735-744.
Oculus VR, LLC, "Oculus Gear VR", downloaded from https://www.oculus.com/gear-vr/, (admitted prior art), 9 pp. total.
Oculus VR, LLC, "Oculus Rift", downloaded from https://www.oculus.com/rift/, (admitted prior art), 15 pp. total.
Oh, Kwan-Jung, et al., "Depth Reconstruction Filter and Down/Up Sampling for Depth Coding in 3-D Video", *IEEE Signal Processing Letters*, vol. 16, No. 9, (Sep. 2009), pp. 747-750.
Oh, Kwan-Jung, et al., "Hole-Filling Method Using Depth Based In-Painting for View Synthesis in Free Viewpoint Television (FTV) and 3D Video", *Picture Coding Symposium (PCS) 2009*, (May 6-8, 2009), 4 pp. total.
Ohm, Jens-Rainer, "Overview of 3D Video Coding Standardization", *Proceedings of the Three Dimensional Systems and Applications (3DSA) International Conference 2013*, (2013), pp. 1-4.
Razavi, R, et al., "Low-delay video control in a personal area network for augmented reality", *IET Image Processing*, vol. 2, No. 3, (2008), pp. 150-162.
Reed, Nathan, "Depth Precision Visualized", retrieved online at https://developer.nvidia.com/content/depth-precision-visualized, (Jul. 15, 2015), 11 pp. total.
Shum, Heung-Yeung, et al., "Survey of Image-Based Representations and Compression Techniques", *IEEE Transactions on Circuits and Systems for Video Technology*, vol. 13, No. 11, (Nov. 2003), pp. 1020-1037.
Sloan, Peter-Pike, et al., "Time Critical Lumigraph Rendering", *Proceedings of the 1997 ACM SIGGRAPH Symposium on Interactive 3D Graphics*, (1997), 7 pp.
Sullivan, Gary J., et al., "The H.264/AVC Advanced Video Coding Standard: Overview and Introduction to the Fidelity Range Extensions", *SPIE Conference on Applications of Digital Imaging Processing XXVII, Special Session on Advances in the New Emerging Standard: H.264/AVC*, (Aug. 2004), pp. 1-21.
Sutherland, Ivan E., "A head-mounted three dimensional display", *1968 International Workshop on Managing Requirements Knowledge*, (1968), pp. 757-564.
Texas Instruments, "DLP Technology for Near Eye Display, Application Report", Literature No. DLPA051A, available online at http://www.ti.com/lit/wp/dlpa051a/dlpa051a.pdf, (Sep. 2014), 18 pp. total.
Tian, Dong, et al., "View Synthesis Techniques for 3D Video", *Applications of Digital Image Processing XXXII, Proceedings of the SPIE*, vol. 7443, (2009), pp. 74430T-1 to 74430T-11.
Urey, Hakan, et al., "State of the Art in Stereoscopic and Autostereoscopic Displays", *Proceedings of the IEEE*, vol. 99, No. 4, (Apr. 2011), pp. 540-555.

(56) References Cited

OTHER PUBLICATIONS

Walls, Frederick, et al., "VESA Display Stream Compression", Downloaded at http://www.vesa.org/wp-content/uploads/2014/04/VESA_DSC-ETP200.pdf, (Mar. 3, 2014), pp. 1-5.

Wetzstein, Gordon, et al., "Tensor Displays: Compressive Light Field Synthesis using Multilayer Displays with Directional Backlighting", *2012 Proceedings of ACM SIGGRAPH Transactions on Graphics (TOG)*, vol. 31, Issue 4, Article 80, (Jul. 2012), 11 pp. total.

Wikipedia, "List of refractive indices", https://en.wikipedia.org/wiki/List_of_refractive_indices, (Dec. 7, 2003), 5 pp. total.

X Company, "Glass", downloaded from http://www.google.com/glass/start/, which redirects to https://x.company/glass/, (admitted prior art), 6 pp. total.

Yan, P., et al., "Integral image compression based on optical characteristic", *IET Computer Vision*, vol. 5, No. 3, (2011), pp. 164-168.

Yang, Lu, et al., "Artifact reduction using reliability reasoning for image generation of FTV", *Journal of Visual Communication and Image Representation*, vol. 21, (2010), pp. 542-560.

Yang, Lu, et al., "Error Suppression in View Synthesis Using Reliability Reasoning for FTV", *3DTV Conference: The True Vision—Capture, Transmission and Display of 3D Video (3DTV—CONO)*, (Jun. 2010), 4 pp. total.

Yi, Faliu, et al., "Fast 3D Computational Integral Imaging Using Graphics Processing Unit", *Journal of Display Technology*, vol. 8, No. 12, (Dec. 2012), pp. 714-722.

Yi, Faliu, et al., "Simultaneous reconstruction of multiple depth images without off-focus points in integral imaging using a graphics processing unit", *Applied Optics*, vol. 53, No. 13, (May 1, 2014), pp. 2777-2786.

Yoo, Hoon, "Artifact analysis and image enhancement in three-dimensional computational integral imaging using smooth windowing technique", *Optics Letters*, vol. 36, No. 11, (Jun. 1, 2011), pp. 2107-2109.

Zhao, Yin, et al., "Boundary Artifact Reduction in View Synthesis of 3D Video: From Perspective of Texture-Depth Alignment", *IEEE Transactions on Broadcasting*, vol. 57, No. 2, (Jun. 2011), pp. 510-522.

U.S. Appl. No. 14/799,269, filed Jul. 14, 2015.

"Office Action dated Dec. 28, 2017; Chinese Patent Application No. 201580012959.X", dated Dec. 28, 2017.

"Office Action dated Nov. 14, 2017; U.S. Appl. No. 14/799,269", dated Nov. 14, 2017.

"Office Action dated Jul. 11, 2018; Chinese Patent Application No. 201580012959.X", dated Jul. 11, 2018.

"Office Action dated May 16, 2018; U.S. Appl. No. 14/799,269", dated May 16, 2018.

"International Search Report and Written Opinion of the International Searching Authority dated Jul. 10, 2015; International Application No. PCT/US2015/010696", (dated Jul. 10, 2015).

"Invitation to Pay Additional Fees and Partial International Search Report; International Application No. PCT/US2015/010696", (dated May 26, 2015).

"Invitation to Pay Additional Fees dated Sep. 23, 2015; International Application No. PCT/US2015/040457", (dated Sep. 23, 2015).

Aggoun, Amar et al., "Immersive 3D Holoscopic Video System", *IEEE Multimedia Magazine, Special Issue on 3D Imaging Techniques and Multimedia Applications*, vol. 20, No. 1, (Jan.-Mar. 2013), pp. 28-37.

Akeley, Kurt, et al., "A Stereo Display Prototype with Multiple Focal Distances", *ACM Trans. Graph. (SIGGRAPH)* vol. 23, (2004), pp. 804-813.

Alpaslan, Zahir Y., et al., "Small Form Factor Full Parallax Tiled Light Field Display", *Proceedings of Electronic Imaging, SPIE-IS &T*, vol. 9391, (Feb. 9, 2015), pp. 93910E-1 to 93910E-10.

Arai, Jun, et al., "Integral Three-Dimensional Television Using a 33-Megapixel Imaging System", *Journal of Display Technology*, vol. 6, No. 10, (Oct. 2010), pp. 422-430.

Candes, Emmanuel, et al., "Near Optimal Signal Recovery From Random Projections: Universal Encoding Strategies?", (2004), pp. 1-39.

Candes, Emmanuel J., et al., "Robust Uncertainty Principles: Exact Signal Reconstruction From Highly Incomplete Frequency Information", *IEEE Transactions on Information Theory*, vol. 52, No. 2, (Feb. 2006), pp. 489-509.

Chai, Jin-Xiang, et al., "Plenoptic Sampling", *Proceedings of the 27th Annual Conference on Computer Graphics and Interactive Techniques—SIGGRAPH '00*, (2000), pp. 307-318.

Chen, Wei, et al., "New Requirements of Subjective Video Quality Assessment Methodologies for 3DTV", *Video Processing and Quality Metrics 2010 (VPQM)*, Scottsdale, United States, (2010), 6 pp. total.

Curless, Brian, et al., "A Volumetric Method for Building Complex Models from Range Images", *Proceedings of the 23rd Annual Conference on Computer Graphics and Interactive Techniques*, (1996), pp. 1-10.

Donoho, David L., "Compressed Sensing", *IEEE Transactions on Information Theory*, vol. 52, No. 4, (Apr. 2006), pp. 1289-1306.

El-Ghoroury, Hussein S., et al., "Quantum Photonic Imager (QPI): A New Display Technology and Its Applications", *Proceedings of the International Display Workshops*, vol. 21, (Dec. 3, 2014), pp. 1202-1205.

Fehn, Christoph, "A 3D-TV Approach Using Depth-Image-Based Rendering (DIBR)", *Proceedings of Picture Coding Symposium*, San Francisco, CA, USA, (Dec. 2004), 6 pp. total.

Fehn, Christoph, "Depth-Image-Based Rendering (DIBR), Compression and Transmission for a New Approach on 3D-TV", *Proc. of SPIE Stereoscopic Displays and Virtual Reality Systems XI*, (2004), pp. 93-104.

Forman, Matthew C., et al., "Objective Quality Measurement of Integral 3D Images", *Proc. SPIE 4660, Stereoscopic Displays and Virtual Reality Systems IX*, 155, (2002), 8 pp. total.

Gilliam, Christopher et al., "Adaptive Plenoptic Sampling", *2011 18th IEEE International Conference on Image Processing*, (2011), pp. 2581-2584.

Graziosi, Danillo B., et al., "Compression for Full-Parallax Light Field Displays", *Stereoscopic Displays and Applications XXV, Proc. of SPIE-IS&T Electronic Imaging*, vol. 9011, (Mar. 6, 2014), pp. 90111A-1 to 90111A-14.

Halle, Michael W., "Multiple Viewpoint Rendering for Three-Dimensional Displays", PhD Thesis, Program in Media Arts and Sciences, School of Architecture and Planning, Massachusetts Institute of Technology, (1997), 164 pp. total.

Heide, Felix et al., "Adaptive Image Synthesis for Compressive Displays", *Proc. of SIGGRAPH 2013 (ACM Transactions on Graphics)*, vol. 32, No. 4, (2013), 11 pp.

Hoffman, David M., et al., "Vergence-accommodation conflicts hinder visual performance and cause visual fatigue", *Journal of Vision*, vol. 8, No. 3, (2008), pp. 1-48.

Hoshino, H., et al., "Analysis of resolution limitation of integral photography", *J. of Soc. Am. A*, vol. 15, No. 8, (Aug. 1998), pp. 2059-2065.

International Organisation for Standardisation, "Call for Proposals on 3D Video Coding Technology", ISO/IEC JTC1/SC29/WG11, MPEG2011/N12036, Geneva, Switzerland, (Mar. 2011), 20 pp. total.

International Organisation for Standardisation, "Use Cases and Requirements on Free-viewpoint Television (FTV)", ISO/IEC JTC1/SC29/WG11, MPEG2013/N14104, Geneva, Switzerland, (Oct. 2013), 12 pp. total.

International Telecommunication Union, "H.264, Series H: Audiovisual and MultiMedia Systems, Infrastructure of audiovisual services—Coding of moving video, Advanced video coding for generic audiovisual services", ISO/IEC 14496-10:2003, Coding of Audio-visual Objects—Part 10: Advanced Video Coding, ITU-T Recommendation H.264, (Mar. 2005), 343 pp. total.

Lee, Cheon, et al., "View Synthesis using Depth Map for 3D Video", *Proceedings of 2009 APSIPA Annual Summit and conference*, Sapporo, Japan, (2009), pp. 350-357.

Levoy, Marc, et al., "Light Field Rendering", *Computer Graphics, SIGGRAPH 96 Proceedings*, (1996), pp. 31-42.

(56) References Cited

OTHER PUBLICATIONS

Lippmann, M. G., "Epreuves reversibles. Photographies integrales." *Comptes-Rendus Academie des Sciences*, vol. 146, (1908), pp. 446-451.
Lucente, M., "Computational holograhic bandwidth compression", *IBM Systems Journal*, vol. 35, Nos. 3&4, (1996), pp. 349-365.
Lucente, Mark, "Diffraction-Specific Fringe Computation for Electro-Holography", Doctoral Thesis Dissertation, MIT Dept. of Electrical Engineering and Computer Science, (Sep. 1994), 171 pp. total.
Lucente, Mark, "Holographic bandwidth compression using spatial subsampling", *Optical Engineering*, Special Section on Electronic Holography, (Jun. 1996), pp. 1-25.
Lucente, Mark, "Interactive Computation of Holograms Using a Look-up Table", *Journal of Electronic Imaging*, vol. 2, No. 1, pp. 28-34, (Jan. 1993), 14 pp. total.
Lucente, Mark, "Interactive holographic displays: the first 10 years", Book chapter for *"Holography—The First 50 Years"*, Draft: 2003, (2003), 17 pp. total.
Lucente, Mark, "Interactive three-dimensional holographic displays: seeing the future in depth", *For special issue of Siggraph's Computer Graphics publication on Current, New, and Emerging Display Systems*, (May 1997), 17 pp. total.
Magnor, Marcus, et al., "Data Compression for Light-Field Rendering", *IEEE Transactions on Circuits and Systems for Video Technology*, vol. 10, No. 3, (Apr. 2000), pp. 338-343.
Maimone, Andrew, et al., "Focus 3D: Compressive Accommodation Display", *ACM Transactions on Graphics*, vol. 32. No. 5, (2013), 13 pp. total.
Malvar, Henrique S., et al., "Lifting-based reversible color transformations for image compression", *Proc. of SPIE of Applications of Digital Image Processing*, vol. 7073, (2008), pp. 707301-1 to 707301-10.
Mori, Yuji, et al., "View generation with 3D warping using depth information for FTV", *Signal Processing: Image Communication*, vol. 24, (2009), pp. 65-72.
Olsson, Roger, et al., "A Combined Pre-Processing and H.264-Compression Scheme for 3D Integral Images", *2006 IEEE International Conference on Image Processing*, (2006), pp. 513-516.
Olsson, Roger, et al., "A Depth Dependent Quality Metric for Evaluation of Coded Integral Imaging Based 3D-Images", *3DTV Conference*, (2007), 4 pp. total.
Park, Jae-Hyeung, et al., "Recent progress in three-dimensional information processing based on integral imaging", *Applied Optics*, vol. 48, No. 34, (Dec. 1, 2009), pp. H77-H94.
Piao, Yan, et al., "Sub-sampling Elemental Images for Integral Imaging Compression", *International Conference on Audio Language and Image Processing (ICALIP)*, (2010), pp. 1164-1168.
Shi, Shasha, et al., "Efficient Compression Method for Integral Images Using Multi-View Video Coding", *2011 18th IEEE International Conference on Image Processing*, (2011), pp. 137-140.
Sjostrom, Marten, et al., "Improved Depth-Image-Based Rendering Algorithm", *3DTV Conference: The True Vision—Capture, Transmission and Display of 3D Video (3DTV-CON)*, (2011), 4 pp. total.
Smolic, Aljoscha et al., "Coding Algorithms for 3DTV—A Survey", *IEEE Transactions on Circuits and Systems for Video Technology*, vol. 17, No. 11, (Nov. 2007), pp. 1606-1621.
Solh, Mashhour, et al., "Depth Adaptive Hierarchical Hole-Filling for DIBR-Based 3D Videos", *Proc. SPIE 8290, Three-Dimensional Image Processing (3DIP) and Applications II*, (2012), pp. 1-11.
Takahashi, Keita, "Theoretical Analysis of View Interpolation With Inaccurate Depth Information", *IEEE Transactions on Image Processing*, vol. 21, No. 2, (Feb. 2012), pp. 718-732.
Takaki, Yasuhiro, "High-Density Directional Display for Generating Natural Three-Dimensional Images", *Proceedings of the IEEE*, vol. 94, No. 3, (Mar. 2006), pp. 654-663.
Tanimoto, Masayuki, et al., "Reference Software of Depth Estimation and View Synthesis for FTV/3DV", *International Organisation for Standardisation*, ISO/IEC JTC1/SC29/WG11, MPEG2008/M15836, Busan, Korea, (Oct. 2008), 5 pp. total.
Vetro, Anthony, et al., "Overview of the Stereo and Multiview Video Coding Extensions of the H.264/MPEG-4 AVC Standard", *Proceedings of the IEEE*, vol. 99, No. 4, (Apr. 2011), pp. 626-642.
Wang, Zhou, et al., "Image Quality Assessment: From Error Visibility to Structural Similarity", *IEEE Transactions on Image Processing*, vol. 13, No. 4, (Apr. 2004), pp. 600-612.
Wegner, Krzysztof, et al., "Enhanced View Synthesis Reference Software (VSRS) for Free-viewpoint Television", *International Organisation for Standardisation*, ISO/IEC JTC1/SC29/WG11, MPEG2013/M31520, Geneva, Switzerland, (Oct. 2013), 4 pp. total.
Wetzstein, Gordon, et al., "Compressive Light Field Displays", *IEEE Computer Graphics and Applications*, vol. 32, Issue 5, (Sep./Oct. 2012), pp. 6-11.
Zhang, Cha, et al., "Compression of Lumigraph with Multiple Reference Frame (MRF) Prediction and Just-in-time Rendering", *Proceeding of the 2000 Data Compression Conference*, DCC 2000 Snowbird, UT, USA; Mar. 28-30, 2000, Los Alamitos, CA, USA; IEEE Comput. Soc., (Mar. 28, 2000), pp. 253-262.
Zhao, Yin, et al., "Suppressing Texture-Depth Misalignment for Boundary Noise Removal in View Synthesis", *28th Picture Coding Symposium, PSC2010*, Nagoya, Japan, (Dec. 8-10, 2010), pp. 30-33.

\* cited by examiner

METHODS FOR FULL PARALLAX COMPRESSED LIGHT FIELD 3D IMAGING SYSTEMS

CROSS-REFERENCE TO RELATED APPLICATIONS

This application claims the benefit of U.S. Provisional Patent Application No. 61/926,069 filed Jan. 10, 2014.

BACKGROUND OF THE INVENTION

1. Field of the Invention

This invention relates generally to image and video compression, more particularly to the compression of light field image data used as input for light field 3D imaging systems. The term "light field" describes the transmission and modulation of the light including, direction, amplitude and frequency, therefore encapsulates imaging systems that utilize techniques such as holography, integral imaging, stereoscopy, multi-view imaging, Free-viewpoint TV (FTV) and the like.

2. Prior Art

REFERENCES CITED

[1] U.S. Patent Application Publication No. US 2009/0086170 A1, Quantum Photonic Imagers and Methods of Fabrication Thereof, Apr. 2, 2009

[2] U.S. Patent Application Publication No. US 2010/0225679 A1, Multi-Pixel Addressing Method for Video Display Drivers, Sep. 9, 2010

[3] U.S. Pat. No. 8,401,316 B2, Method and apparatus for block-based compression of light-field images

[4] U.S. Patent Application Publication No. US 2013/0077880, Systems and methods for encoding light field image files

[5] U.S. Patent Application Publication No. US 2013/0077882, Systems and methods for decoding light field image files

[6] U.S. Patent Application Publication No. US 2011/0134227 A1, Methods and apparatuses for encoding, decoding, and displaying a stereoscopic 3D image

[7] U.S. Pat. No. 5,613,048, Three-dimensional image synthesis using view interpolation

[8] U.S. Patent Application Publication No. US 2008/0043095, Method and system for acquiring, encoding, decoding and displaying 3D light fields

[9] U.S. Pat. No. 6,009,188, Method and system for digital plenoptic imaging

[10] U.S. Pat. No. 6,738,533 B1, Minimum sampling rate and minimum sampling curve for image-based rendering

[11] U.S. Pat. No. 8,284,237 B2, Rendering multiview content in a 3D video system

[12] U.S. Patent Application Publication No. US 2012/0213270 A1, Method and Apparatus for Compressive Imaging Device

[13] U.S. Pat. No. 6,097,394, Method and system for light field rendering

[14] U.S. Patent Application Publication No. US 2013/0010057, 3d disparity maps

[15] U.S. Patent Application Publication No. US 2010/0156894, Rendering 3D Data to Hogel Data

[16] U.S. Patent Application Publication No. US 2010/0231585, Systems and Methods for Processing Graphics Primitives

[17] U.S. Pat. No. 6,963,431, Rendering methods for full parallax autostereoscopic displays

[18] A. Vetro, T. Wiegand, G. Sullivan, "Overview of the stereo and multiview video coding extensions of the H.264/MPEG-4 AVC standard", Proceedings of the IEEE, vol. 99, no. 4, April 2011

[19] ISO/IEC JTC1/SC29/WG11, Call for Proposals on 3D Video Coding Technology, Geneva, Switzerland, March 2011

[20] Levoy and Hanrahan, Light Field Rendering, Computer Graphics, SIGGRAPH 96 Proceedings, pp. 31-42, 1996

[21] Magnor and Girod, Data Compression for Light-Field Rendering, IEEE Transaction on Circuits and Systems for Video Technology, v. 10, n. 3, April 2000, pp. 338-343

[22] Candès, E., Romberg, J., Tao, T., "Robust uncertainty principles: Exact signal reconstruction from highly incomplete frequency information," IEEE Trans. Inform. Theory 52 (2006) 489-509

[23] David Donoho, "Compressed sensing," IEEE Transactions on Information Theory, Volume 52, Issue 4, April 2006, Pages: 1289-1306

[24] Candès, E., Tao, T., "Near optimal signal recovery from random projections and universal encoding strategies," (2004)

[25] Gordon Wetzstein, G., Lanman, D., Hirsch, M., Heidrich, W., and Raskar, R., "Compressive Light Field Displays", IEEE Computer Graphics and Applications, Volume 32, Issue 5, Pages: 6-11, 2012

[26] Heide, F., Wetzstein, G., Raskar, R. and Heidrich, W., "Adaptive Image Synthesis for Compressive Displays", Proc. of SIGGRAPH 2013 (ACM Transactions on Graphics 32, 4), 2013

[27] Hoffman, D.; Girshick, A.; Akeley, K. & Banks, M. (2008), "Vergence-accommodation conflicts hinder visual performance and cause visual fatigue", Journal of Vision 8 (3), 33

[28] ISO/IEC 14496-10:2003, "Coding of Audiovisual Objects—Part 10: Advanced Video Coding," 2003, also ITU-T Recommendation H.264 "Advanced video coding for generic audiovisual services."

[29] C. Fehn, "3D-TV Using Depth-Image-Based Rendering (DIBR)," in Proceedings of Picture Coding Symposium, San Francisco, Calif., USA, December 2004

[30] Malvar, H. S., Sullivan, G. J., and Srinivasan, S., "Lifting-Based Reversible Color Transformations for Image Compression", Proceeding SPIE Applications of Digital Image Processing, 2008

[31] M. Lucente, Diffraction-Specific Fringe Computation for Electro-Holography, Doctoral Thesis Dissertation, MIT Depart. of Electrical Engineering and Computer Science, September 1994

[32] Z. Alpaslan et al, U.S. Patent Application Publication No. US 2013/0141895, Spatio-Optical Directional Light Modulator, Dec. 16, 2011

[33] H. S. El-Ghoroury et al, U.S. Patent Application Publication No. US 2013/0258451, Spatio-temporal Directional Light Modulator, Jul. 11, 2012

[34] S. Guncer, U.S. Patent Application Publication No. US 2010/0007804, Image Construction Method Based Video Display System, Jan. 14, 2010

[35] S. Guncer, U.S. Patent Application Publication No. US 2010/0225679, Multi-Pixel Addressing Method for Video Display System, Sep. 9, 2010

[36] H. S. El-Ghoroury et al, U.S. Patent Application Publication No. US 2013/0321581, Spatio-Temporal Light Field Cameras, Oct. 24, 2012

OVERVIEW

Depth perception in the human visual system relies on several depth cues. These cues can be categorized in to psychological (perspective, shading, lighting, relative size, occlusion and texture gradient, etc.) and physiological depth cues (vergence, accommodation, motion parallax, binocular disparity, etc.). While psychological depth cues provide a relative understanding of the depth in a light field, physiological depth cues provide absolute depth information. Commercially available 3D displays use a subset of the physiological depth cues to enhance the viewing experience.

Glasses based 3D displays have been gaining popularity since the introduction of glasses based 3D TVs by all the major TV manufacturers. The biggest shortcoming of the currently available technology has been identified as the use of 3D glasses, which can be categorized as either active or passive. In general, glasses based technology is uncomfortable for the viewers to use for long time periods and pose challenges for people who require prescription glasses.

Autostereoscopic displays use directional modulators (such as parallax barriers or lenticular sheets) attached to a display surface to create a 3D effect without requiring glasses. Commercially available autostereoscopic displays typically use horizontal parallax to present the 3D information to the viewer. The main problems of this display technology are the limited viewing angle and the limited resolution per view, resulting in a lower quality 3D image. In addition, within the viewing angle, the user has to keep his head vertical, otherwise the 3D effect disappears.

Long time viewing in both glasses based 3D displays and horizontal parallax only light field displays typically cause discomfort due to a physiological effect known as vergence accommodation conflict (VAC) [27], because the eyes focus on the display surface but need to converge away from it to perceive objects that are depicted at different depths.

A more natural 3D effect is achieved with full parallax 3D display technology. In addition to horizontal parallax, this technology also has vertical parallax, such that a vertical movement of the viewer shows a different view of the 3D scene. Full parallax displays generally have an order of magnitude or more views than horizontal parallax only displays. Arranging these views densely creates a very natural 3D image that does not change by a user moving or tilting his head and also eliminates VAC, by providing correct accommodation and vergence cues. 3D displays that eliminate the vergence accommodation conflict are typically referred to as VAC-free 3D displays.

The main challenge associated with such full parallax 3D displays is that the increase in the modulated image resolution required to render full parallax 3D images with wide viewing angles creates a new impairment for the display system; namely, a substantially increased amount of image data. The generation, acquisition, transmission and modulation (or display) of image data for a VAC-free full parallax light field display requires data rate in tens of Terabits per second (Tbps). A quick inspection of the input images shows the ample inherent correlation between the light field data elements, known as holographic elements or "hogels", and compression algorithms have been proposed to deal with this type of data in the prior art [31]. However, as it can be appreciated by those skilled in the art, only a limited number of the compression methods described in the prior art can be implemented in real-time, and none of these methods can render and/or compress the amount of data required to drive a full parallax VAC-free display in real-time. For example, the most advanced video compression format, H.264/AVC, can manage to compress Ultra high resolution video frame (4,096×2,304 @56.3, or 0.5 Gpixels/sec) at a data bit rate of approximately 3 Gbits/sec[28]. H264/AVC would fail to achieve the sufficient amount of compression needed for the transmission of light field image data and much less if the light field is refreshed in real time at 60 Hz video rate where data rates can reach up to 86 Tbps.

Current compression standards do not exploit the high correlation that exists both in horizontal and vertical directions in a full parallax light field image. New compression standards targeting 3D displays are being developed. Nevertheless they are targeting horizontal parallax only, a limited number of views and usually require an increased amount of memory and computational resources. Compression algorithms have to balance quality, compression ratio and computational load. As a general rule, a higher compression ratio in an encoder increases the computational load, making real-time implementation very difficult. If both high compression and decreased computational load is required then quality is sacrificed. A compression solution that is able to simultaneously provide for high quality, high compression ratio, and relatively low computational load is highly desired.

It is therefore an objective of this invention to introduce light field compression methods that overcome the drawbacks of the prior art, thus making it feasible to create VAC-free full parallax 3D displays that utilize the compression methods of this invention for various compressed light field imaging systems to reduce the data rate, processing requirements in both encoding and decoding and also power consumption for the whole imaging system. Additional objectives and advantages of this invention will become apparent from the following detailed description of a preferred embodiment thereof that proceeds with reference to the accompanying drawings.

PRIOR ART

The transmission of large data can be alleviated with the use of compressed data format. In conventional light field systems, the entire light field is first captured, and then it is compressed using either conventional image/video compression algorithms or light-field specific encoders. The compressed data can be transmitted, stored or reconditioned for the display, where it is decompressed and modulated (examples of light field compression systems are given in U.S. Pat. No. 8,401,316 B2 [3], or U.S. Pat. Application No. US2013/0077880 [4]).

Light Fields can be compressed using multi-view compression (MVC) standard [18]. The hogels can be interpreted as frames of a multi-view sequence and the disparity between images are estimated and encoded. The block-based disparity estimation generates inaccuracies that are encoded by a block-based encoder, and the compression performance grows linearly with the number of images.

To improve multi-view coding, new coding standards are considering the adoption of techniques from the field of computer vision [19]. With the use of per-pixel depth, reference images can be projected to new views, and the synthesized images can be used instead of the costly transmission of new images. This technique requires an increased amount of computational resources and local memory at the decoder side, posing a challenge for its real-time implementation. The compression tools are also targeting their use in horizontal only multiview sequences, and do not exploit the geometric arrangement of integral images.

Methods developed exclusively for light field image compression include a vector quantization method described by Levoy et al [20], and video compression-based methods described by Magnor et al [21]. The use of vector quantization is limited and cannot achieve high compression performances such as those presented by Girod. Girod's methods are similar to a multiview compression algorithm, where the geometrical regularity of the images is exploited for disparity estimation. However, the methods require an increased amount of local memory, and are not suited for real-time implementation.

Along with the problem of data compression, there is also the issue of data acquisition. The generation of the entire light field for encoding requires large amounts processing throughput and memory, and many samples may be discarded at the compression stage. A recently developed technique named Compressed Sensing (CS) deals with this problem. The underlying principal behind Compressive Sensing is that a signal that is highly compressible (or equivalently sparse) in some transform domains can be minimally sampled using an incoherent basis and still reconstructed with acceptable quality [22], [23]. This new paradigm shifts the complexity from the acquisition to the reconstruction process, which results in more complex decoders. This tendency is aligned with the trend of computational displays, which present computational capability directly in the display devices. Displays that have computational capacity and are able to deal directly with compressed data are also known as compressive displays [25,26] and [34, 35].

It is clear that the prior art fails to adequately address the need for high compression ratio, high quality, low computational load light field data compression as is required for practical implementation of VAC-free full parallax, wide viewing angle 3D display technologies.

BRIEF DESCRIPTION OF THE DRAWINGS

In the following description, like drawing reference numerals are used for the like elements, even in different drawings. Parallelogram blocks are used to describe data, while rectangular blocks are used to describe processes. The matters defined in the description, such as detailed construction and elements, are provided to assist in a comprehensive understanding of the exemplary embodiments. However, the present invention can be practiced without those specifically defined matters. Also, well-known functions or constructions are not described in detail since they would obscure the invention with unnecessary detail. In order to understand the invention and to see how it may be carried out in practice, a few embodiments of it will now be described, by way of non-limiting example only, with reference to accompanying drawings, in which.

DETAILED DESCRIPTION OF THE PREFERRED EMBODIMENTS

General Concepts

Figure 1A:
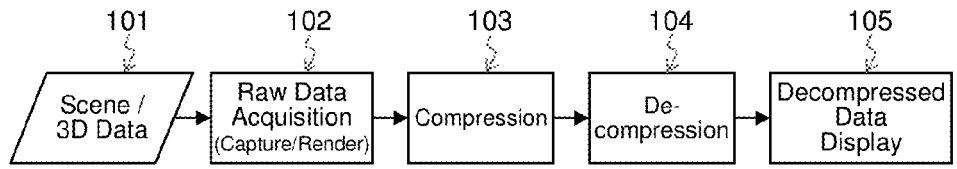
FIG. 1a shows prior art light field imaging systems.

The present invention makes use of some well-known techniques in the computer graphics field, which are defined herein for completeness.

In computer graphics, the act of creating a scene or a view of a scene is known as view rendering. Usually a 3D model is used, along with lighting, surface properties and the camera point of view. This view rendering generally requires several complex operations and also a detailed knowledge of the scene geometry. An alternative technique to render novel views is to use multiple surrounding viewpoints. Known as Image-Based Rendering (IBR), this technique renders novel views directly from input images that oversample the light field. IBR generates views with more realistic quality, however it requires a more intensive data acquisition process, data storage and redundancy in the light field.

A tradeoff between the complex geometrical models and the data intensive IBR is the use of depth information and a selected number of views. Each view has a depth associated with each pixel position, also known as depth maps. The depth maps are then used to synthesize the new views, a process called depth image-based rendering (DIBR) [11] and [29]. DIBR utilizes the depth information and the extrinsic and intrinsic parameters of the virtual cameras to project points of a 2D screen into their respective 3D positions, and then re-project the 3D points on a target 2D screen, an operation also known as forward warping. The reverse operation is also valid, where the depth values of the target view are known, and the texture values are "fetched" from a reference view. In this case, the operation is called backward warping. The biggest issue with DIBR synthesis is the generation of holes, due to inaccuracy in depth values, round-off errors and objects disocclusion.

In the present invention the term "hogel" is used as the smallest unit of a light field image that contains information that can be directionally modulated by the 3D display to all available directions. In lens based imaging systems, a hogel consists of an elemental image under a lenslet or a microlens that modulates the elemental image directionally. In a refraction based imaging system a hogel consist of the smallest segment of the hologram that contains all the modulated frequencies.

Current methods of light field display capture or render the light field in full resolution and then later compress it to remove the redundancy in the full resolution light field. The present invention, on the other hand, performs both operations in one single step, simultaneously capturing or rendering and compressing the light field. We call the fusion of both capture/render and compression the Compressed Capturing system. Compressed Capture is defined as a method that unites the acquisition and the compression stages of a light field imaging system into one single step, and generates a light field in compressed format, also known as a compressed light field. The compressed light field contains the minimal or near minimal information necessary to reconstruct the entire light field with acceptable quality. In contrast to compressive sensing, where signals are acquired utilizing an incoherent basis with no particular knowledge of the scene, except for the fact that it is known that the signal is sparse in a determined domain, the compressed capture approach preferably utilizes high-level scene information to make a more conscious decision when selecting the information for generating a compressed light field. The invention utilizes the computational capability of the display to reconstruct a light field that was minimally sampled during the acquisition stage directly at the display. In one possible embodiment, this invention uses a two stage compression framework to create an efficient data processing flow. The first stage, hereby referred to as Compressed Rendering, is more suited toward the goal of reducing the number of views to be rendered, and therefore reducing the processing throughput needed and consequently the imaging system power consumption. Compressed Rendering is defined as any rendering or generation of a sub-sampled light field, most preferably containing a sub-set of hogel data used to represent the minimal or near minimal light field information necessary for reconstruction of the light field with acceptable quality, wherein the hogel data is selected by a pre-process most preferably by performing a high-level analysis of the scene. The process of light field sub-sampling into hogel data generates hogels, henceforth referred to as reference hogels. The reference hogel data can be physically obtained from real-world captured light fields such as from one or more light field cameras, synthetically rendered using computer graphics, or even a combination of both methods (for example, in but not limited to augmented reality applications). The second stage, hereby referred to as Display-Matched Encoder, takes into account the hardware characteristics of the display system, and applies an encoding algorithm suited for parallel and real-time implementation. Display-Matched Encoder is defined as any compression of 3D data matching the display's computational capabilities, though more preferably the display-matched encoder is adapted for decompressing using multi-processing capabilities of the display, and most preferably the display-matched encoder is used wherein a 3D image is subdivided into numerous hogel areas, in which the display-matched encoder of each such hogel area is substantially independent of the display-matched encoder of other hogel areas to facilitate decompression using multiple substantially identical processing nodes in or associated with the display. Within each hogel area, one or more hogels are transmitted and received independently. Those hogels are henceforth referred to as seed hogels. The remaining hogels are transmitted and received relative to the seed hogel(s). A rendering process uses the seed hogels to generate one or more synthetic views, which are used as prediction for one or more remaining hogels. The Display-Matched Encoder then encodes the difference between the original hogel and the predicted synthesized hogel. The synthesized hogel is also referred to herein as a residual hogel. By utilizing two separate processes, local and global optimization can be done for both stages, to achieve the overall desired performance of reduced power consumption, increased data compression, reduced transmission bandwidth, reduced system complexity, reduced cost, reduced processing requirements, and reduced memory requirements while allowing real-time operation and a high quality light field reproduction.

One of the embodiments of the present invention described herein with accompanying drawings demonstrates ways of increasing the compression ratio while reducing the computational load to create high quality light field images in real-time. In the Compressed Rendering method of this invention, a priori knowledge about the 3D scene within the light field is used to capture, for example using frame grabbers, the smallest subset of hogels' texture and depth map information sufficient to reconstruct the scene without perceptual quality degradation. Multi-Reference depth-image based rendering (MR-DIBR) is used to synthesize the remaining hogels. A priori knowledge of the scene can be extracted by means of pre-processing the input data, and will be explained through embodiments further in this disclosure. The embodiment described herein is by no means limiting, and the present invention can be implemented through different embodiments, such as for example, performing compressed capturing directly at a light field camera. In the display-matched encoder, the data captured in the compressed rendering stage is further compressed in a way that matches the capabilities of the display (also referred to herein as the light field modulator) that modulates this light field data. The combination of the compressed rendering and the display-matched encoder methods of this invention reduce the total computational load in a 3D light field capture and display system and allow for real-time operation while not introducing any new perceptual image degradation. The embodiment described herein is by no means limiting, and the present invention can be implemented through different embodiments. For example, another embodiment of this invention can combine the two aforementioned stages into one, where the Compressed Rendering stage utilizes display parameters and performs the compressed capturing (without an explicit Display-Matched Encoder stage), sending to the display the reference hogels that might have been selected according to display parameters, where the display reconstructs the entire light field utilizing depth image based reconstruction with only the received minimal hogel information. Analogously, yet another embodiment of this invention may utilize only the display-matched encoder stage described above, and suppress the compressed rendering. One possible alternative embodiment of the present invention may use a compressive display such as [34, 35] which describe methods to use discrete Walsh Transform (DWT) or discrete Cosine Transform (DCT) coefficients as the input to the display, and perform decompression using the integrative aspects of the human visual system (HVS), without further processing at the display side. This alternative embodiment performs display-matched encoding only, and sends compressed information directly to the display. The presentation of these possible embodiments serves to illustrate practical implementations of the invention, but the invention can be modified or optimized without departing from the intended spirit and scope of this invention.

Figure 1B:
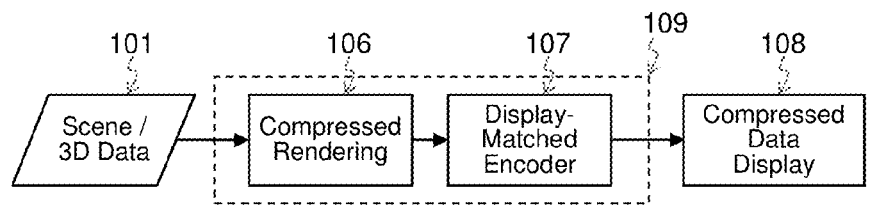
FIG. 1b illustrates the underlying principal of this invention, whereby the scene/3D data is captured and transmitted to the display in a compressed format and the display directly displays the compressed data.

FIG. 1b illustrates the underlying principal of this invention, whereby the scene/3D data 101 is captured and transmitted to the display in a compressed format and the display directly displays (or modulates) the compressed data. One embodiment of this invention deals with the capture of a 3D scene or rendering and compression of the scene/3D data 101, including but not limited to aerial terrain texture images, radar or LIDAR data with terrain elevations or city maps, landscapes, computer-generated 3D imagery, medical images, images taken with light field cameras or multiple cameras simultaneously or at different times. Prior Art light field imaging systems illustrated in FIG. 1a, first render or capture the scene/3D data 101 in a full light field rendering process 102. Due to the high volume of data, a light field compression step 103 is used to reduce the data size. The compressed data is then transmitted to the display system, where it is first decompressed 104 then displayed 105. In contrast, the present invention illustrated by FIG. 1b avoids the expensive capture or rendering of the entire light field altogether by first rendering the scene/3D data 101 using the compressed rendering 106, compressing it by a display-matched encoder 107 then transmitting it to the display in the compressed format. Referring to FIG. 1 b, the compressed rendering 106 and display-matched encoder 107 together form the compressed capturing system 109 of this invention that utilizes the redundancy inherent in the light field data to efficiently generate a compressed representation suitable for direct display. The redundancy within the light field image exists in the temporal, angular (or directional) and spatial (or x-y) domains, being represented by similar values of the pixels comprising a hogel and between hogels. In one embodiment of this invention the compressed light field, represented as a bitstream, is transmitted directly to the display 108, which decodes the bitstream and reconstructs a light field that depicts the 3D scene with its details of texture and depth, without the need of glasses or any special equipment. It is also possible to store the bitstream at any stage in storage medium for a later use or display.

Compressed Rendering 106—

Figure 2A:
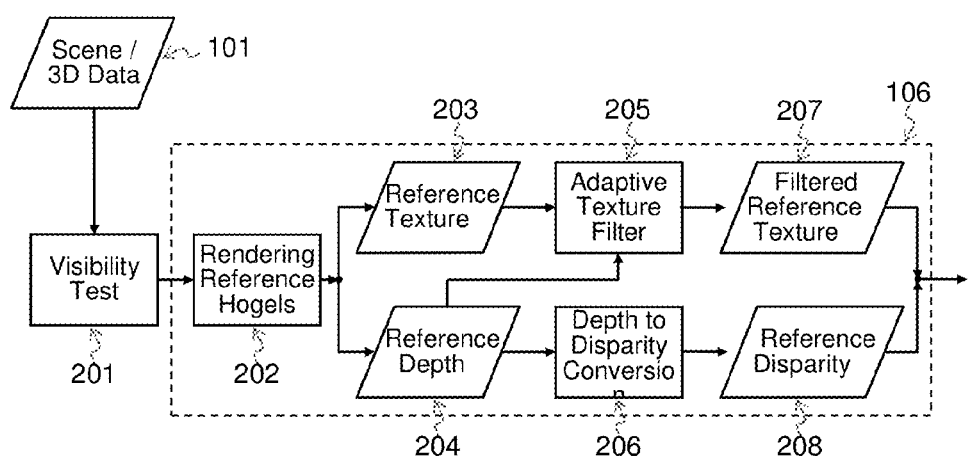
FIG. 2a is a block diagram of the compressed rendering method of this invention.
Figure 2B:
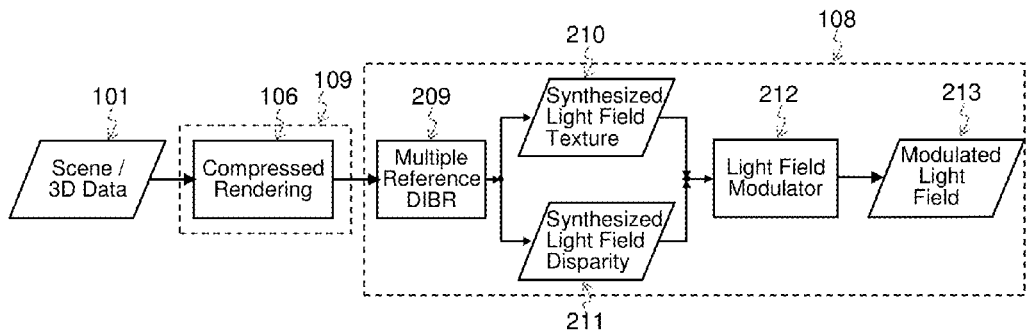
FIG. 2b is a block diagram of the compressed rendering method directly connected to the display, where the light field is reconstructed using multiple reference depth image based rendering.

The compressed rendering 106 of this invention is the rendering of the smallest number of hogels sufficient to be used by the display-matched encoder 107 while achieving minimum acceptable perceptual image degradation. Compressed rendering avoids the conventional costly operations (projection matrix multiplication, lighting calculations, texture mapping, etc.) involved in the conventional rendering of the hogels. Compressed rendering also avoids the costly storage requirements needed by a light field camera that captures light field at full sensor resolution. Referring to FIG. 2a, the underlying concept behind the compressed rendering 106 of this invention is to select, using the visibility test 201, and render 202 only a subset of the light field hogels, henceforth referred to as the reference hogels. Selection of the reference hogels is based on using a visibility test 201 that analyzes the 3D data to preferably optimally choose the reference hogels positions to be rendered. For example, in one embodiment, the visibility test may indicate which cameras from a camera array should be used to capture the light field or even which cameras should have their content digitized by the frame grabber. In yet another embodiment, the visibility test will indicate which virtual cameras should be rendered by the computer graphics rendering application. The rendering process generates the reference hogels texture 203 and per-pixel depth map 204. Computation time and power are saved by rendering a smaller number of hogels instead of rendering all the hogels of the light field. The selected reference hogel texture might be post-processed after rendering by an adaptive texture filter 205. As described in one embodiment below, an example of adaptive texture filter is a filter to remove high frequency content that is not imaged by the light field display. In another embodiment of this invention a conversion from depth to disparity 206 might be applied, in order to deal with a simple and direct unit of pixel displacement. The output of the compressed rendering stage, that is the filtered reference hogel texture 207 and its associated reference hogel depth, possibly converted into reference hogel disparity 208, can be further used by a reconstruction stage present at the display 108, avoiding the display-matched encoder step as mentioned previously and illustrated in FIG. 2b. In this embodiment, the display system utilizes a multiple-reference depth-image based rendering (MR-DIBR) 209 algorithm to synthesize the remaining or residual hogels and reconstruct the light field texture 210 and disparity 211. The light field modulator 212 utilizes the reconstructed data to then generate the modulated light field 213. Notice that this embodiment utilizes depth information as converted into disparity due to the advantages that will be explained later, but the same invention also applies to the direct use of depth, without any conversion.

Figure 3:
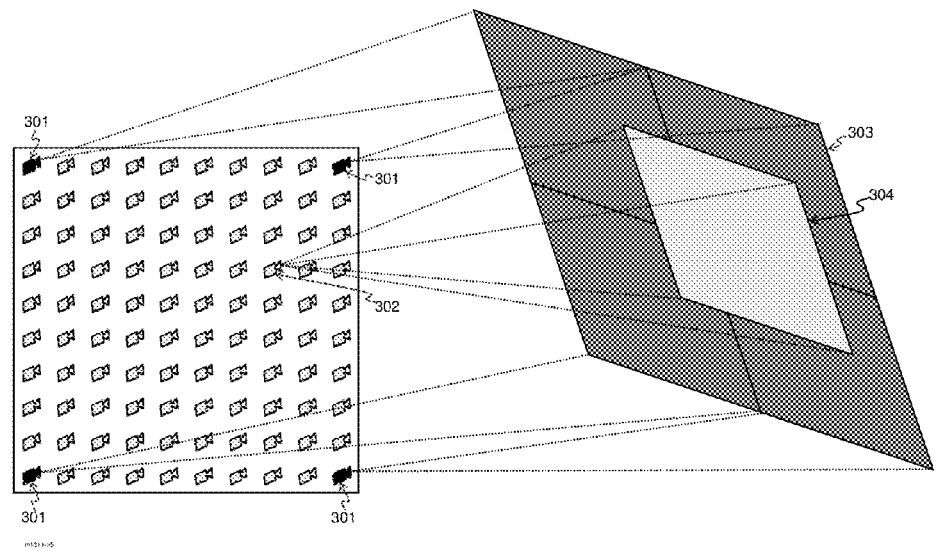
FIG. 3 illustrates the relation between a target hogel to be synthesized and the reference hogels of the compressed rendering method of this invention.

One aspect of the invention is the rendering of selected reference hogels using a pre-defined rendering algorithm. There are many different rendering algorithms that can be applied for rendering reference hogels; one skilled in the art would recognize that some possibilities are: dual frustum rendering, multi view rendering, parallel group rendering and others. Even optimized rendering algorithms are still computationally complex and could require excessive resources. The use of a rendering algorithm based on the depth of the elements in the light field can translate the complex operations of view projection into simple pixel shifting. Restrictions of such approach are the synthesis of disoccluded areas, where no reference texture pixel can be found. To fill in such areas, the common solution is to use inpainting methods. Such inpainting methods would synthesize the missing texture by using information restricted to the background texture, identified by comparing depth values of surrounding texture. This approach requires more complex calculations and is still prone to errors. One embodiment of this invention is based on using other references that depict the disoccluded texture, that is, using views that contain the missing texture. This requires the use of a larger number of reference hogels; however the quality can be far superior than conventional inpainting methods. In order to maintain image quality and low computational demand, this embodiment is based on the use of a larger number of reference hogels and resort to a synthetic hole filling operation only when all the reference hogel textures are not able to reproduce the disoccluded area. The relation between the visual field covered by the reference hogels and the visual field of a non-reference hogel, henceforth called a target hogel, is illustrated in FIG. 3. In FIG. 3, pinhole virtual cameras represent the reference and target hogels. The frustas 303 of the reference hogels 301 are able to capture (or cover) the entire viewing area from a certain distance to the display surface. All the remaining hogels that have their viewing area 304 covered by the combined frustas 303 of the reference hogels 301, such as hogel 302 for example, can be appropriately synthesized using the reference hogels 301. By using multiple references, the compressed rendering method of this invention is capable of covering holes from different directions and minimizes the use of hole filling as a post-processing operation. FIG. 3, shows the usage of the four corner hogels as a reference, however this invention also contemplates the use of other reference hogel arrangements.

Selecting Reference Hogels Using a Visibility Test 201—

Figure 4:
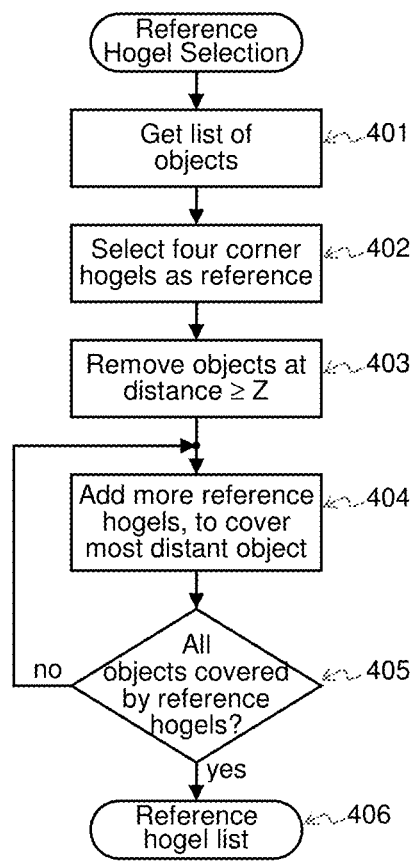
FIG. 4 is a flowchart of one embodiment of the visibility test used to select the reference hogels for the compressed rendering method of this invention.

In one embodiment of this invention the process of selecting the reference hogels to be rendered may be derived using a top-down approach in which a coarse grid is used and later on refined. In another embodiment of this invention a bottom-up approach is used for selecting the reference hogels that starts with a fine grid which is later on pruned to remove unnecessary hogels. FIG. 4 illustrates a method for selecting reference hogels (the visibility test 201 in FIG. 2) based on the former of the aforementioned methods of selecting reference hogels. As depicted in FIG. 4, a top-down approach can be realized by analyzing the positions of the objects of the scene relative to the surface plane where the light field is captured or rendered (i.e., the surface where the pinhole virtual cameras capturing/rendering the scene are positioned, or in the case when the capturing cameras are the same as the display hogels, the display surface; henceforth called the capturing surface). The choice of reference hogels would then depend on the position of objects specified in the list of objects 401 as explained below. In the preferred embodiment of this invention, the hogel selection process is initiated by choosing the four corner hogels as reference hogels 402. Since with this selection the four corner hogels as references, objects positioned at a certain depth Z from the capturing surface or further away are covered by these corner hogels, objects at distances equal to or greater than Z are removed from the list of objects 403. The remaining objects are sorted according to their distance from the capturing surface, and more hogels are added to the list of reference hogels as needed to cover the most distant object 404. The process 404 of selecting the reference hogels for each object is based on 2-dimensional sampling of the object's projection area on the capturing surface. The projection area of the object determines which hogels will contain the texture of the object, and can be used as references. A 2-dimensional sampling procedure of these hogels selects the hogels to be used as references. Notice that scenes with multiple objects might have overlapping reference hogel selection, and only reference hogels that were not previously selected are added to the list of reference hogels. The depth of the object z determines the hogels sampling period Δ for each object used for selecting the reference hogels that cover that object, $$\Delta = \left\lfloor \frac{2z \tan\left(\frac{\theta}{2}\right)}{P} \right\rfloor$$

Where, θ is the hogel angular field of view, and P is the hogel spacing (or pitch). Since the field of view of the hogels selected based on this process covers the entire object, the missing hogels between the selected hogels can be generated using the texture and the depth of the selected hogels. In order to incorporate disoccluded textures of an object behind the current object but further away from the display surface, additional "edge" hogel positions are added to the set of selected hogels by extending the projection area of the object being analyzed by at least one half of a sampling period Δ in all directions. This process is repeated 405 until all the objects in the list 401 are covered by the resulting set of selected reference hogels 406.

Figure 5:
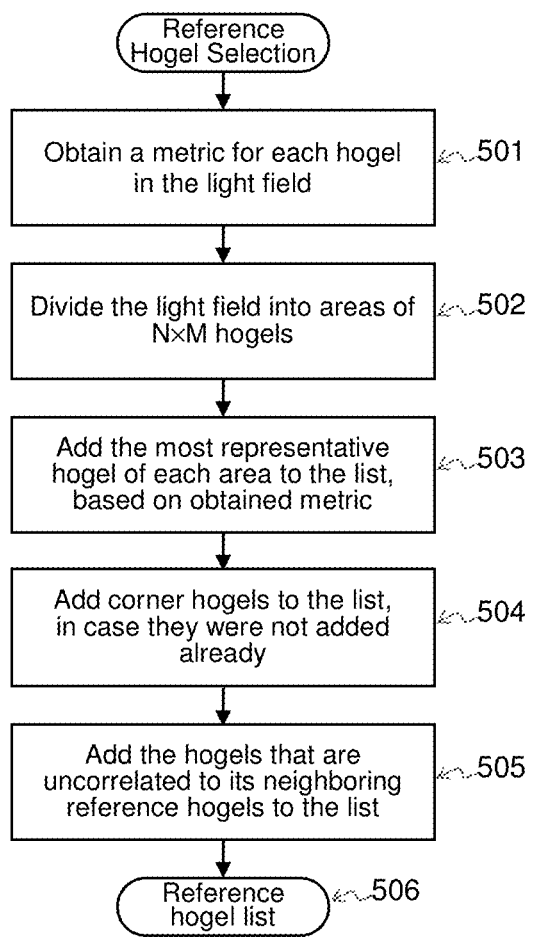
FIG. 5 is a flowchart of an alternative embodiment of the visibility test used to select the reference hogels for the compressed rendering method of this invention.
Figure 6:
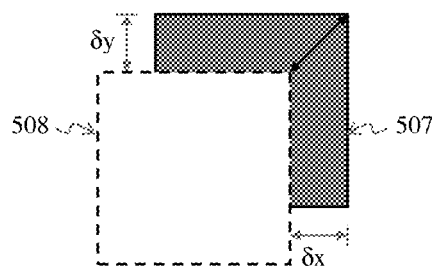
FIG. 6 illustrates the reference hogel selection criteria of the alternative embodiment of FIG. 5 of the visibility test used to select the reference hogels for the compressed rendering method of this invention.

FIG. 5 illustrates an alternative embodiment of the visibility test 201 of this invention which starts with the maximum number of hogels allowed by the system, and performs reference hogel selection in a bottom-up approach to generate the reference hogel list 506. In this method for selecting reference hogels a metric criterion for each of the hogels is first calculated 501. One example of such a criterion could be the correlation between neighboring hogels for which the median disparity value of the disparity values present in a hogel could be used as a metric, but those skilled in the art would recognize that other criteria apply as well. The disparity value is the pixel shift between two views, and is inversely proportional to the distance of the point to the capturing view. In the case of a light field with regular 2D camera arrangement, the disparity between two adjacent cameras can be used to convey the depth of the objects being depicted, as well as the disparity between any two neighboring views. To use the disparity with non-adjacent cameras, one needs to scale the disparity value according to the distance between those cameras. In one embodiment of this invention the total number of hogels within the light field is divided into areas of N×M hogels 502 from which one representative hogel would be selected and added to the hogel reference list 503. The size of the N×M hogel area can be adaptively selected according to elements of the scene. For example, for scenes depicting objects far away from the capturing surface, all hogels are highly correlated and the N×M hogel area might be the entire set of hogels. On the other hand, for objects close to the capturing surface the correlation between hogels might be small, and N×M may be just one single hogel. Also other factors might influence the N×M hogel area size, such as for example, constraints in the display system that accepts a maximum number of hogels to be processed in parallel, or equivalently, a maximum value for N. The most representative hogel within the N×M hogels area would be selected based on the obtained median disparity value. One possible implementation of this selection criterion is illustrated in FIG. 6. Assuming that all the objects covered by a selected reference hogel 508 are depicted in the depth layer indicated by the median disparity value of that hogel, when the pixels of the selected reference hogel 508 are shifted to synthesize a target hogel, some pixels of the target hogel 507 might not be present in the reference hogel. Those pixel positions are called holes and indicated by the gray area 509 in FIG. 6. The total number of holes can be calculated given the median disparity value of the reference hogel 508 and its displacement δx and δy from the target hogel 507 to be synthesized. The reference hogel that minimizes the number of holes from its neighboring hogels within the N×M area of hogels is therefore chosen to be the most representative hogel of that area, and is added to the reference hogel list 503. In order to avoid artifacts at the border of the image, corner hogels are also added 504, in case these hogels were not added in the previous step. Furthermore, in order to avoid missing hogels that are not correlated to the selected reference hogel within the N×M hogel area, the median disparity value of all hogels are inspected one more time. In case a non-reference hogel has a median disparity value larger than a pre-defined threshold, the hogel is added to the reference hogel list 505 and becomes a reference hogel. Because its median disparity value indicates that the hogel is not related to the already selected reference hogel and contains new texture, the hogel cannot be reconstructed from the previously selected hogel references, and needs to be added to the list of reference hogels for normal rendering.

The preceding paragraphs provided descriptions of two methods for selecting the reference hogels, however this invention is not limited to either methods specifically described and similar methods may be used for the purpose of determining the subset of reference hogels that can be used to recover the remaining hogels of the light field. To determine which elemental image (or hogels) are the most relevant to reconstruct the information of the scene a pre-processing step or some type of a priori information is required. This a priori information is usually in the form of, but not limited to, object locations in the scene, bounding boxes, camera sensor information, target display information and motion vector information.

In a computer generated (CG) capture environment, where computer generated 3D models are used to capture a full parallax light field image, all the information is already known by the system before the rendering process is started. This information includes location of the models, size of the models, bounding box of the models, capture camera information (CG cameras) motion vectors of the models and target display information.

For displaying a dynamic light field, as in the case of displaying a live scene that is being captured by a light field camera, by an array of 2D cameras, by an array of 3D cameras (including laser ranging, IR depth capture, or structured light depth sensing) or by an array of light field cameras, the preprocessing methods and data include, but are not limited to, accurate or approximate objects size, location and orientation of the objects in the scene and their bounding boxes, target display information for each target display, position and orientation of all cameras with respect to the 3D scene global coordinates, and more.

Adaptive Texture Filtering 205—

A light field display system cannot reproduce light field details that are smaller than the hogel size. The hogel size can therefore be characterized as the Nyquist frequency for the details that a light field display system can reproduce. Furthermore, due to optical divergence in any light field display system, the highest frequency details that can be reproduced become less than the display system Nyquist frequency as a reproduced object moves further from the display surface. Therefore a light field reproduced by a light field display system has the ability to display Nyquist frequency details closer to display surface and lower than Nyquist frequency details away from the display surface proportional to 1/(distance from the display surface). Taking this fact into account a depth-adaptive low pass filter can be used to adjust the reference hogel texture contents based on the reference hogel depth map information to filter out details that a light field display system cannot reproduce. By eliminating the unreproducible details of the object, the depth-adaptive low pass filter has the benefit of also increasing the compression ratio without degrading the perceived image quality.

Depth to Disparity Conversion 206—

In computer graphics workflow, the depth of a pixel is typically stored in a buffer, also known as the depth buffer or the Z-buffer. In one embodiment of the present invention, the depth information used for synthesizing (rendering) the hogels can be derived from the 3D model, and can be obtained from the Z-buffer typical in computer graphics workflow. Other embodiments of this invention can obtain depth from different methods, such as time-of-flight cameras and also depth obtained from signal processing procedures, such as stereo matching. For example, stereo pair cameras can be used for capturing. After camera calibration and image rectification, a stereo matching algorithm can be used to extract depth from stereo. The result is called a depth map, and can be used in the present invention in a manner similar to the Z-buffer from computer graphics. The use of disparity instead of depth is preferred because it can be highly compressed, it avoids division operations and can simplify the decoder's implementation. Due to the uniform geometric arrangement and optical characteristics similarity of the hogels, the depth values of the reference hogels can be converted into normalized disparity values based on the distances between two adjacent hogels. This value can then be used to warp pixels between any two hogels by scaling the disparity value of the reference hogel with the distance between the reference and the target hogel.

In the typical way (prior art) of converting depth to disparity, when the depth value is to large negative ($-\infty$) or large positive values ($+\infty$), the disparity is equal to zero in both cases, which results in losing the sign of the depth. In addition, quantizing the disparity value is highly desired for compression; which requires a separate set of operations in prior art. Addressing both of these drawbacks of the prior art, the preferred embodiment of the invention preserves the original sign of the depth, while also utilizing a conversion method that incorporates a quantization scaling for fixed-point arithmetic, in the following manner:

$$\text{disparity} = \left\lfloor \delta \times \frac{f \times P}{\text{Depth} \times pp} + 0.5 \right\rfloor + \frac{\text{depth}}{|\text{depth}|} \quad \text{if depth} \neq 0$$
$$\text{disparity} = 0 \quad \text{if depth} = 0$$

Where $\delta$ is the disparity value quantization precision in bits, pp is the hogel pixel pitch, P is the hogel spacing (or pitch), and f is the focal length of the virtual camera representing the hogels. The final value is clipped between the values $-2^{(n-1)}+1$ and $2^{(n-1)}-1$, to limit the range of disparity values to within n bits word length. In one embodiment of the present invention, the disparity precision $\delta$ could range from 1 to 16 bits, with preferred values being selected to allow preserving the accuracy while still allowing simple pixel shifting; such as $\delta=4$. The number of bits n used for representing the quantized disparity value depends on the architecture of the system hardware. Disparity value word length n ranging from 8 to 64 bits would be typical, but preferably an efficient number of bits such as n=10 can be used to preserve integer shifts for hogels far away from each other. In case it is necessary, higher numbers of bits can be used to represent disparity values, as well as its precision. With this conversion, a resultant disparity value of +1 represents the positive infinite depth value (i.e., objects that are in front of the capturing surface), −1 represents objects with negative infinite depth value (i.e., objects behind the capturing surface) and 0 represents indefinite disparity value, and should be treated as an exception. Notice that the use of disparity is advantageous in terms of hardware simplicity and data compression, due to the use of fixed-point arithmetic and quantization of the depth layers. Nevertheless, this invention also contemplates the use of depth without any conversion, or similar conversions that would facilitate pixel shifting at the rendering stage.

Multiple Reference DIBR (MR-DIBR) 207—

Figure 7:
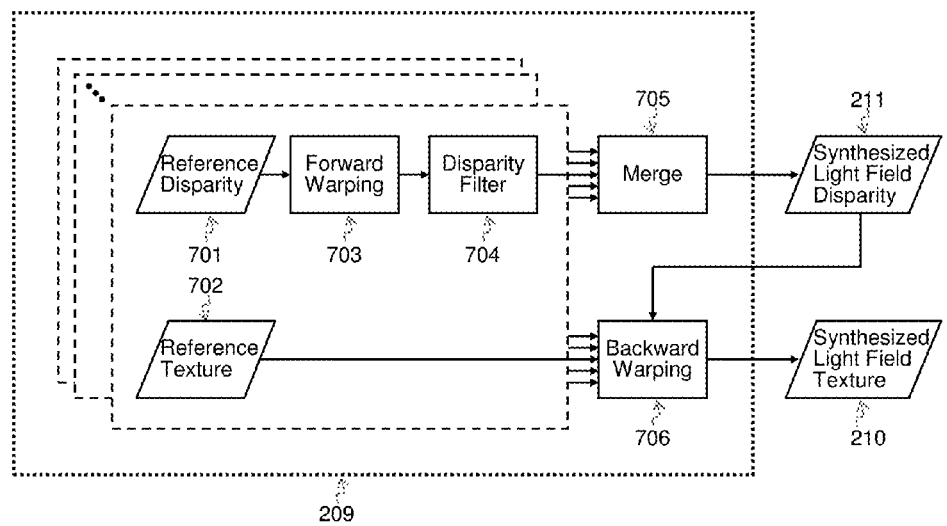
FIG. 7 illustrates the process of this invention of synthesizing the light field hogels using the reference hogels.
Figure 8:
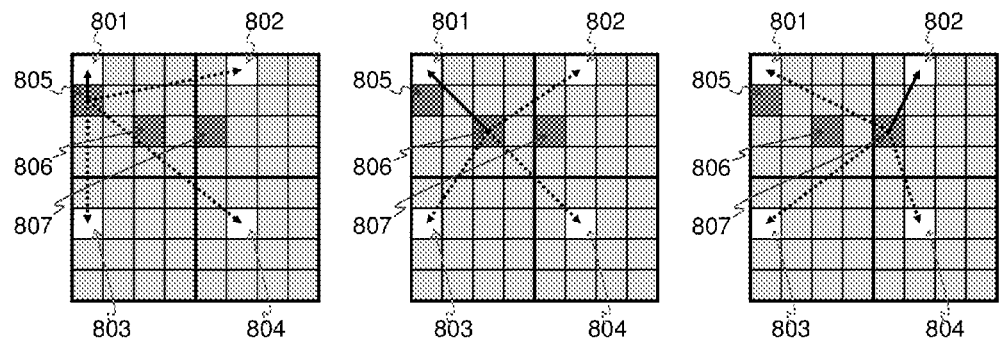
FIG. 8 illustrates one embodiment of this invention for synthesizing the light field hogels disparity using the reference hogels depth information.

As previously described, reference hogels are selected wherein they comprise a part of the entire light field. The non-reference hogels are called target hogels. The target hogels are synthesized using the texture and depth maps of the reference hogels. This process is also known as depth image-based rendering (DIBR). In the presented embodiment of this invention, two unique aspects of the adopted DIBR is that it preferably uses normalized disparity instead of depth and the number of references is not restricted to one or two horizontally aligned references, as is commonly found in state-of-the-art DIBR algorithms. Our approach takes advantage of the 2D structure of the capturing surface plane and uses multiple reference hogels to cover the target hogel and minimizes the holes in the target texture. The algorithm is called multiple reference DIBR (MR-DIBR) and FIG. 7 illustrates the components of the adopted synthesis algorithm. At first the references disparities 701 are forward warped 703, that is, the disparity values are projected from the reference hogels to the target hogel's position. The described embodiment uses the disparity converted from the original depth map of the reference value. The disparity is calculated using the distance between adjacent hogels. In order to use the disparity value for projection to hogels at different distances, a scaling factor defined as the normalized distance between hogels needs to be used. FIG. 8 illustrates an example of the distances between target hogels 805-807 and the set of reference hogels 801-804 that is used to scale the disparity values of the multiple reference hogels. The distances illustrated in FIG. 8 provide the magnitude of horizontal and/or vertical pixel shifts from the reference hogels to the target hogel. Notice that the use of disparity is not mandatory, and this invention also includes embodiments that use depth values instead of converted disparity values. Due to the use of quantized values and round-off operations due to the use of fixed-point arithmetic, the warped disparity might present artifacts. For example, quantization of disparity values may create one to two pixel wide holes in the warped disparity, known as cracks. Therefore, in other to mitigate such artifacts, a disparity filter 704 is used. The result of all references are then merged 705 together to a final disparity map, which represents the synthesized light field disparity map 211. This result is used with the reference hogels' textures in the backward warping block 706 to render synthesized light field texture 210. Notice that this procedure can involve fractional pixel displacement, and still result in some holes from the merging operation. The remaining holes can be synthetically filled with inpainting algorithms. For example, one possible embodiment of an inpainting algorithm extends the texture of the background horizontally into the hole. Another possibility is to use Navier-Stokes inpainting algorithm to extend the texture of the border of the hole into the empty area. This invention is not limited to one particular embodiment of hole filling algorithm, and can use any possible method.

Figure 9:
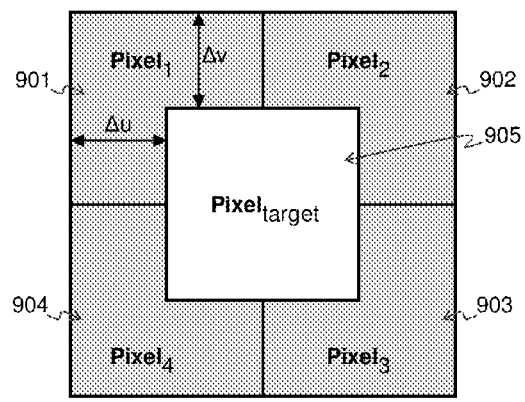
FIG. 9 illustrates details of the backward warping used in the multi-reference depth image based rendering (MR-DIBR) of this invention.

FIG. 9 illustrates details of a possible embodiment of backward warping used in the MR-DIBR of this invention. Even though each reference hogel texture has an integer number of pixel locations 901-904, a potential target hogel pixel 905 disparity value D can be a non-integer value. Two possible ways of handling this situation are either rounding the value to an integer or use non-integer (or fractional) displacement value in calculating the hogel texture using MR-DIBR. The fractional displacement values Δu and Δv can be used in the backward warping operation to interpolate a more appropriate texture value to be used for the synthesis. The delta values can be used along with the disparity values as weighting factors for interpolating a more appropriate texture value to be used for the backward warping. Another example of an embodiment of backward warping 709 that could be used in the MR-DIBR of this invention is the use of hogels with different resolution. In this case, the reference hogel texture to be used by the backward warping 709 could have higher resolution than the target hogel. The backward warping operation, implemented as described earlier by pixel shifting, is done with the higher resolution reference hogel texture, and then the result is down-sampled to the resolution of the target hogel. The down-sampling operation could incorporate filtering that can be used to avoid cracks and holes, usually caused by round-off and quantization errors, and can potentially improve the final quality of the synthesized target hogel. The methods mentioned herein are possible embodiments of this invention incorporated in order to improve the final quality of the synthesized light field. This and other similar techniques are henceforth a part of this invention.

Display Matched Encoder 107—

Figure 10:
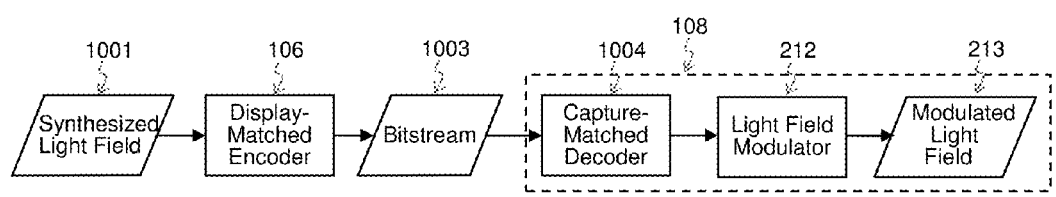
FIG. 10 is an overview of the display-matched encoding and decoding processes of this invention.

Referring to FIG. 10, one possible embodiment of this invention utilizes the rendered reference hogels along with the synthesized ones to form the synthesized light field 1001, that is, the union of the synthesized light field disparity 211 and synthesized light field texture 210 from FIG. 2. The synthesized light field 1001 would typically incorporate a fair amount of correlation and would need to be compressed further. This is accomplished in this invention, as illustrated in FIG. 10, by compressing the synthesized light field data using the display-matched encoder 107 (described in a subsequent paragraph), which compresses the synthesized light field data and generates a bitstream 1003. The display-matched encoder 107 substantially reduces the data bandwidth to make it feasible for transmission to the display 108. The display-matched encoder targets the reduction of local angular information inside the hogels (represented by the hogels' pixels), which is not exploited in the compressed rendering approach. The combination of both approaches result in an overall reduction in data rate, making the compressed capturing system even more efficient. Another benefit of the display-matched encoder is that requirements of the display can be incorporated into this stage, isolating the compressed rendering stage from the influence of the actual hardware. In this sense, the display-matched encoder can serve as a proxy between the result achieved with the compressed rendering stage and the decoding hardware in the display. For example, if the display does not have the capability to use multiple references in its local reconstruction algorithm (DIBR) due to memory limitations, residual hogels (explained in the following paragraphs) can be sent to compensate the lack of references. The light field display then locally decodes the data with the capture-matched decoder 1004, (as described in a subsequent paragraph) and reconstructs (modulates) 212 the array of hogels that constitutes the light field 213. Notice that in the present invention, the full reconstruction of the light field prior to transmission to the display can be avoided by using the disparity information, which results in a light field imaging system that deals only with compressed data. In general, while the compressed rendering utilizes the knowledge about the scene to reduce the captured data, the display matched encoding utilizes the knowledge about the display hardware, software and optical capabilities to compress the data further and also format it in a way that would be most useful for the display. The capabilities of the display that can be considered during display matched encoding include but not limited to: Processing capabilities of the display, interface requirements of the display, number of hogels in the display, lenslet psf (point spread function) for the hogel lens, viewing distance of the display, estimated depth range of the display, amount of memory available in the display, display refresh rate, display viewing angle, display pixel pitch, display number of pixels, display modulation capabilities, display modulation speed, display modulation modes, etc.

One possible embodiment of the display matched encoder of this invention uses a parallel encoding/decoding architecture aiming to achieve high compression while at the same time attend to the strict processing and memory constraints of the display system. The display-matched compression of this invention enables parallel decoding at the display side by encoding subsets of the hogels each of which is referred to herein as Processing Nodes (PN). With the parallel decoding enabled by display-matched encoder of this invention, processing at the display side can be highly parallelizable in order to achieve the throughput and memory needed for processing the light field data by having each PN working in parallel to decode their respective subset of hogels and reconstruct the entire light field collectively in parallel. It should be noted the display-matched encoder of this invention can be designed to match the choice of hardware at the display side and its processing throughput and memory capabilities. This is an important feature of the display-matched encoder of this invention because it allows the 3D compressed imaging system of this invention to take full advantage of the continuous advancements in the semiconductor technology and the resultant increase in processing throughput and memory it offers progressively. In different embodiments of this invention, the display-match encoder can also process a different number of hogels at the same time, and can also account for different pixel modulation types, such as spatially and/or temporally multiplexed pixels. Some variants of the display-matched encoder of this invention are discussed in the embodiment described in the following paragraphs.

Figure 11:
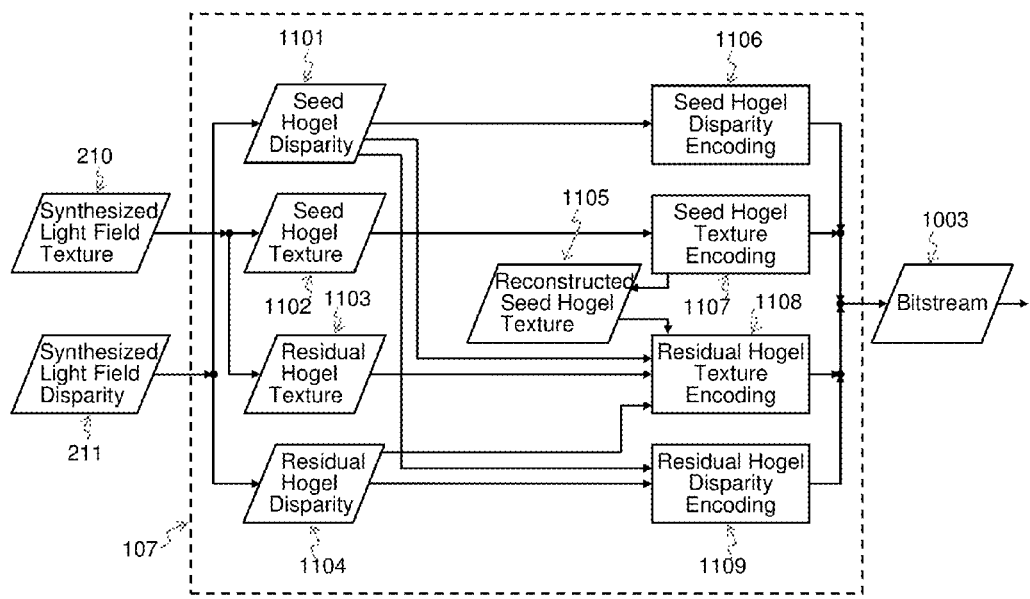
FIG. 11 illustrates details of the display-matched encoding process of this invention.

One example of the light field hogel partition of the light field used to implement the display-matched encoder of this invention is to divide the hogel array into independent areas comprising N×N hogels. Other embodiments of this invention might not divide the light field into independent hogel areas, or might use hogel areas of different sizes, and are included in this description. When a value of N=4 is used, it means a sub-array of 4×4 comprising 16 hogels are processed together by one PN. The value of N is a configuration parameter of the display-matched encoder of this invention that is determined according to the display processing capabilities and is not restricted to the value of N=4 of the given example, and can range from 1, when all hogel are processed (encoded or decoded) independently, to the entire light field when all hogels are processed jointly. For each of the PN hogel areas, a row scanning of the hogels is performed, and a sequence of hogels is created. FIG. 11 illustrates details of the PN encoding process for one such hogel area. In this embodiment one or more hogels within the PN hogel area, each herein referred to as the "seed hogel", would be encoded independently and the remaining hogels within the respective PN hogel area, herein referred to as the "residual hogels" would be encoded relative to the selected seed hogels. A seed hogel may or may not be one of the reference hogels, as seed hogels are preferably selected based on some metric that will tend to minimize the number of bits needed for the residual hogels within the respective PN area, while reference hogels were selected to provide sufficient light field data for the overall 3D image for reconstruction of the overall 3D image, preferably with no or at least tolerable or minimum holes and cracks that may be covered consistent with the bandwidth of the system.

Referring to FIG. 11, the seed hogel texture 1102 and disparity 1101 are encoded by the seed hogel texture encoder 1107 and seed hogel disparity encoder 1106, respectively. Details of the encoding processed are explained in the following paragraphs. In order to encode the residual hogels using the seed hogels it is important that both encoder and decoder use the same reference. Since the encoding method used for the seed hogel's texture is not lossless, the seed texture encoder 1107 illustrated in FIG. 11 includes an internal decoding loop that reconstructs the seed hogel texture 1105, which is the same texture to be used by the decoder. For the residual encoding process illustrated in FIG. 11, the residual hogel disparity 1104 is encoded 1109 using the seed hogel disparity 1101 as a reference. The residual hogel texture 1103 is encoded 1108 using the seed hogel's disparity 1101, the residual hogel's disparity 1104 and the reconstructed seed hogel texture 1105. The results of all encoders are aggregated in the bitstream 1003.

Figure 12:
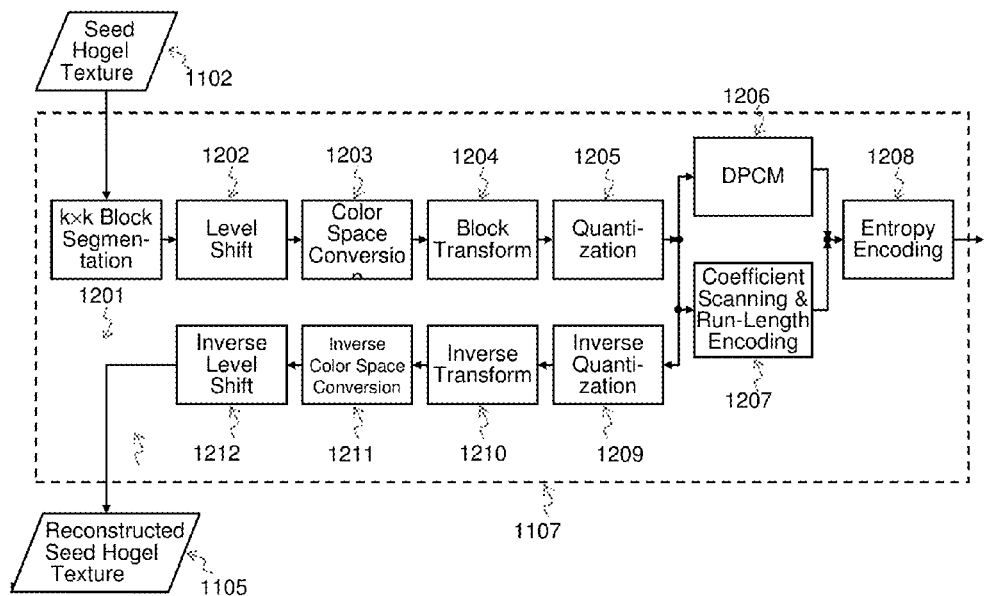
FIG. 12 illustrates the details for seed hogel texture encoding process used in one embodiment of the display-matched encoding process of this invention.

FIG. 12 illustrates the details for seed hogel texture encoding 1107. The seed hogel texture 1102 is segmented into blocks of k×k pixels 1201. For each block of pixels, the seed hogel texture values are level shifted by a fixed value 1202 that is, the texture pixel values are subtracted by the central value of the possible range of pixel values, in order to obtain positive and negative values (in the case of 8-bit range, a constant value of 128 is used). The seed hogel pixels color space is then converted to a color space that decorrelates the color channels 1203. One example of color space conversion for this embodiment is the RGB to YCoCg color conversion [30]; however other color spaces, including but not limited to YUV or YCbCr, may also be used without restrictions. Next, a block transform 1204, such as DCT transform or an integer transform or the like, is applied to each of the color channels. The transform concentrates the energy of the seed hogel block in only a few coefficients. These coefficients are then quantized 1205, using a scaling parameter adjusted according to the statistics and the distribution of energy of the block transformation coefficients. Since seed hogels are used later as reference, the quality of block transformation coefficients needs to be preserved as much as possible. The DC coefficient, which usually contains most of the information of the block, is then coded separately, using a DPCM scheme 1206, while the AC coefficients are scanned and coded, using for example zig-zag scan and run-length encoding 1207. Finally the bitstream is entropy encoded 1208 preferably using a Huffman entropy encoder, context-adaptive binary arithmetic encoder (CABAC) or a context-adaptive variable length coder (CAVLC) or the like. Seed hogels are used as reference to code residual hogels, which means that both encoder and decoder must use the same seed hogel values. Since the quantization block introduces losses to the texture values, the reconstructed seed hogel by the decoder is different from the original seed hogel at the encoder side. Therefore, in order to use the same reference in both encoder and decoder, a decoding loop is added to the encoder, to generate the reconstructed seed hogel texture 1105 that is utilized at the decoder side. The decoding loop is constituted by the inverse of the encoding operations, the inverse quantization block 1209, inverse transform 1210, inverse color space conversion 1211 and inverse level shift 1212. It should be noted that the scope of this invention is not limited to the encoding steps and methods described in this paragraph as illustrated in FIG. 12 and alternative encoding methods, algorithms and implementations are also possible within the context of this invention.

Figure 13:
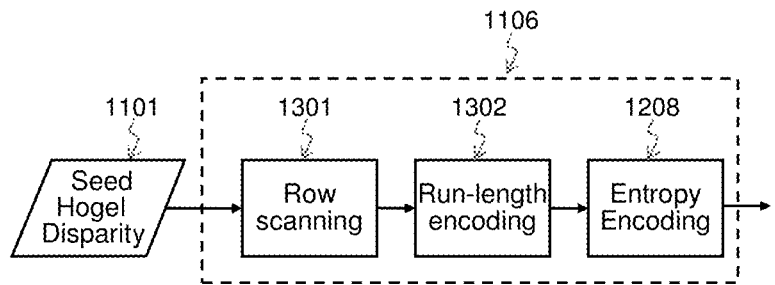
FIG. 13 illustrates the details of the seed hogel disparity encoding process used in one embodiment of the display-matched encoding process of this invention.

FIG. 13 illustrates the details of the seed hogel disparity encoding 1106. Since there are no dependencies between the texture coding and the disparity coding of a seed hogel, the texture and disparity encoding can be performed independently either simultaneously or sequentially depending upon the available processing capabilities. For the encoding of the disparity values, a row scanning 1301 of the values is done first then a run-length encoding 1302 is performed. Finally, the values are entropy encoded 1208 and added to the bitstream, whereby the entropy encoding is preferably performed using a Huffman entropy encoder, a context-adaptive binary arithmetic encoder (CABAC) or a context-adaptive variable length coder (CAVLC) or the like. In this embodiment, compression of the disparity information is done without any losses, but other schemes to compress disparity may also be used, including lossy compression schemes. Notice however that, similar to the texture, if a lossy approach is adopted, the encoder must present the decoding loop to reconstruct the compressed disparity map and maintain the synchronization with the decoder. It should be noted that the scope of this invention is not limited to the encoding steps and methods described in this paragraph as illustrated in FIG. 13 and alternative encoding methods, algorithms and implementations are also possible within the context of this invention.

Figure 14:
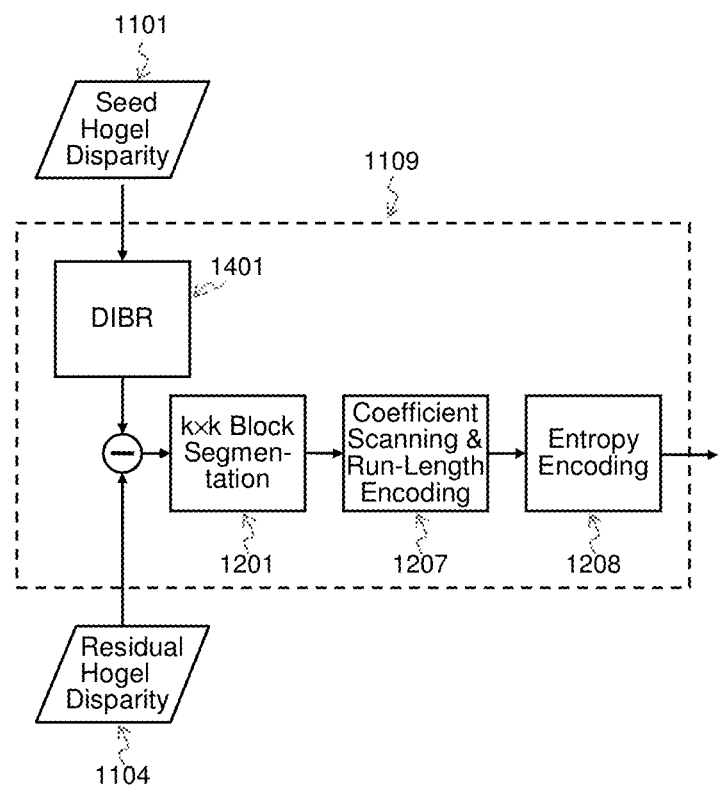
FIG. 14 illustrates the details of the residual hogel disparity encoding process used in one embodiment of the display-matched encoding process of this invention.
Figure 15:
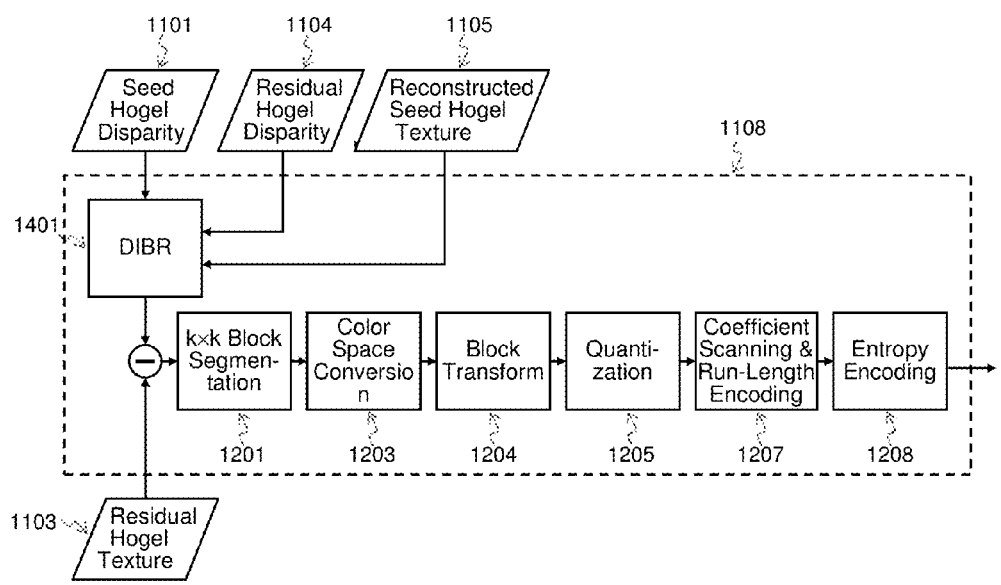
FIG. 15 illustrates the details of the residual hogel texture encoding process used in one embodiment of the display-matched encoding process of this invention.

FIG. 14 illustrates the details of the residual hogel disparity encoding 1109. As illustrated in FIG. 14, difference values between the residual hogel disparity 1104 and the warped seed disparity (i.e., shifted seed disparity after applying the depth image based rendering—DIBR 1401, which uses the same methods explained for the MR-DIBR 209 procedure of FIG. 2b) are segmented into blocks of k×k pixels 1201, and since most of the blocks are likely zero, only the non-zero values are processed further. These non-zero values are then scanned (for example, zig-zag scan) and run-length encoded 1207 then also Huffman encoded 1208 before being processed further. FIG. 15 illustrates the details of the residual hogel texture encoding 1108. Referring to FIG. 15, the DIBR block 1401 uses the reconstructed seed hogels texture 1105, the seed hogel disparity 1101, and the residual hogel disparity 1104 to generate a disparity-compensated reconstruction of the residual hogel texture. This disparity-compensated reconstruction is used as a prediction for the residual hogel texture and is formed by shifting the seed hogel pixels to the residual hogel position. Holes might occur during this warping operation. Block-based transform coding is used to code the holes and any resultant inaccuracies from this warping operation. Similarly to the process of seed hogel texture encoding, the difference between the residual hogel texture 1103 and its disparity-compensated prediction is divided into blocks of k×k pixels 1201, their color space is converted 1203, transformed 1204, quantized 1205, scanned and run-length encoded 1207. The result is entropy encoded 1208 and added to the bitstream. It should be noted that the scope of this invention is not limited to the encoding steps and methods described in this paragraph as illustrated in FIG. 14 and alternative encoding methods, algorithms and implementations are also possible within the context of this invention.

Adaptive Hogel Coding Rate Optimization—

Figure 16:
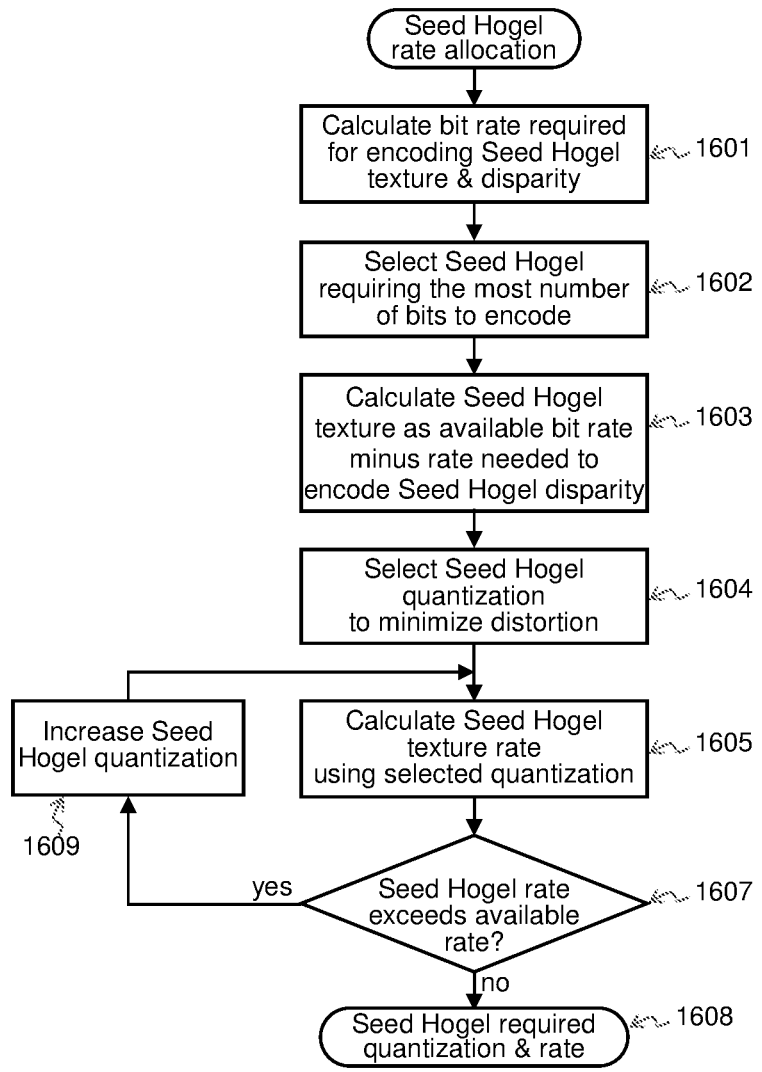
FIG. 16 illustrates the method for bit rate allocation for seed hogels used in one embodiment of this invention.
Figure 17:
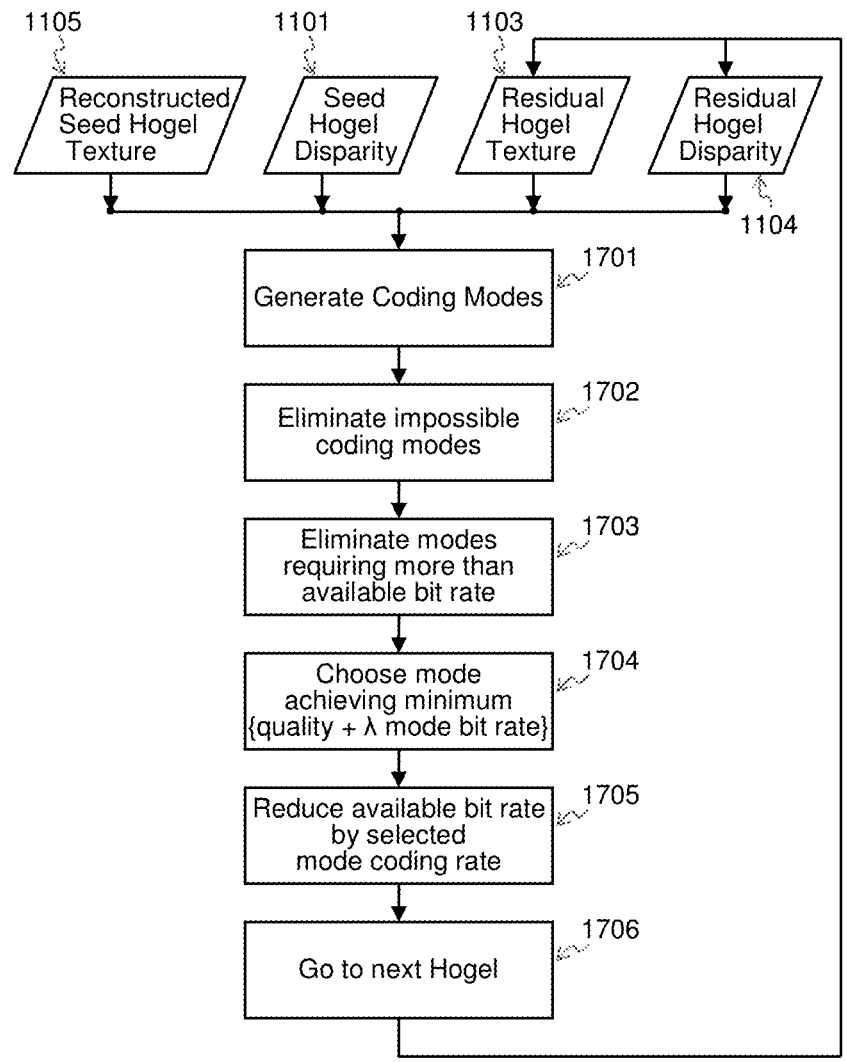
FIG. 17 illustrates the method for bit rate allocation for residual hogels used in one embodiment of this invention.

One important feature of the display-matched encoder of this invention is the adaptive allocation of the interface bandwidth available between the various components of the light field display system, or equivalently, the bit rate allocation of the compression algorithm. Given the excessive interface bandwidth needed by 3D display systems, the available interface data rate (or bit rate) is considered to be the main bottleneck in most all 3D display systems. Since in the 3D Compressed Imaging system of this invention seed hogels are used as reference, these hogels are encoded with more bits to preserve their quality as much as possible, and are given the priority in the allocation of interface data rate (or bit rate) and the parameters for coding the residual hogels are adaptively selected subject to the constraints of the available interface data rate. FIGS. 16 and FIG. 17 illustrate the method this invention applies to adaptively allocate the bit rate for the seed hogels and for the residual hogels; respectively. Referring to FIG. 16, the total number of bits available for encoding the seed hogels texture and disparity is calculated 1601. The texture of the seed hogel that requires the most number of bits to code its disparity is selected to optimize the encoding quantization step size 1602. The coding quantization step size, used in the quantization block 1205 of FIG. 12, controls the level of information present in the coefficients of the texture, and therefore the number of bits that is used to code the texture. Larger quantization steps can reduce the number of bits necessary to encode the hogel at the cost of introducing possible distortion. The bit rate available for coding this seed hogel texture is determined by the total available bit rate minus the rate needed to code the disparity information and header information 1603. The coding quantization step parameter that results in the minimum distortion possible in coding the seed hogel texture is selected 1604 and the corresponding coding quantization step size is then used to calculate the bit rate required for coding the seed hogel texture 1605. If the bit rate calculated is less than the available bit rate 1607, then the selected quantization step is used for hogel encoding, otherwise the quantization step is increased 1609 and the bit rate calculation is reevaluated one more time. This continues until a quantization step is found which allows for coding the seed reference hogel within the available bit budget 1608. Referring to FIG. 17, there are several possible encoding modes 1701 that can be employed to match the coded residual hogels bandwidth to the available bit rate, such as sending the correction texture, disparity, or even skipping the hogel and using only the available prediction. The feasibility and resulting quality in using any one of such modes respective to the bit rate needed to code the residual hogel is assessed and coding modes that are not feasible are eliminated as a choice 1702. Coding modes that result in bandwidth that is greater than available bit rate are also eliminated 1703. Selection among the remaining coding modes is accomplished using a Lagrange cost optimization 1704, where the cost function is defined by a selected quality metric (for example, minimum distortion) plus lambda times the bit rate, where lambda is a parameter derived from the quantization step. The optimization of the residual hogels coding bandwidth takes into account the available bit rate and selects the coding mode having the smallest cost function and subtracts the amount of bits used from the total of bits available for residual hogel encoding 1705, and in order to preserve the selected quality metric, resorts to coding modes that use less bits only in case of lack of sufficient bandwidth 1702.

Decoding of the Compressed Light Field—

Figure 18:
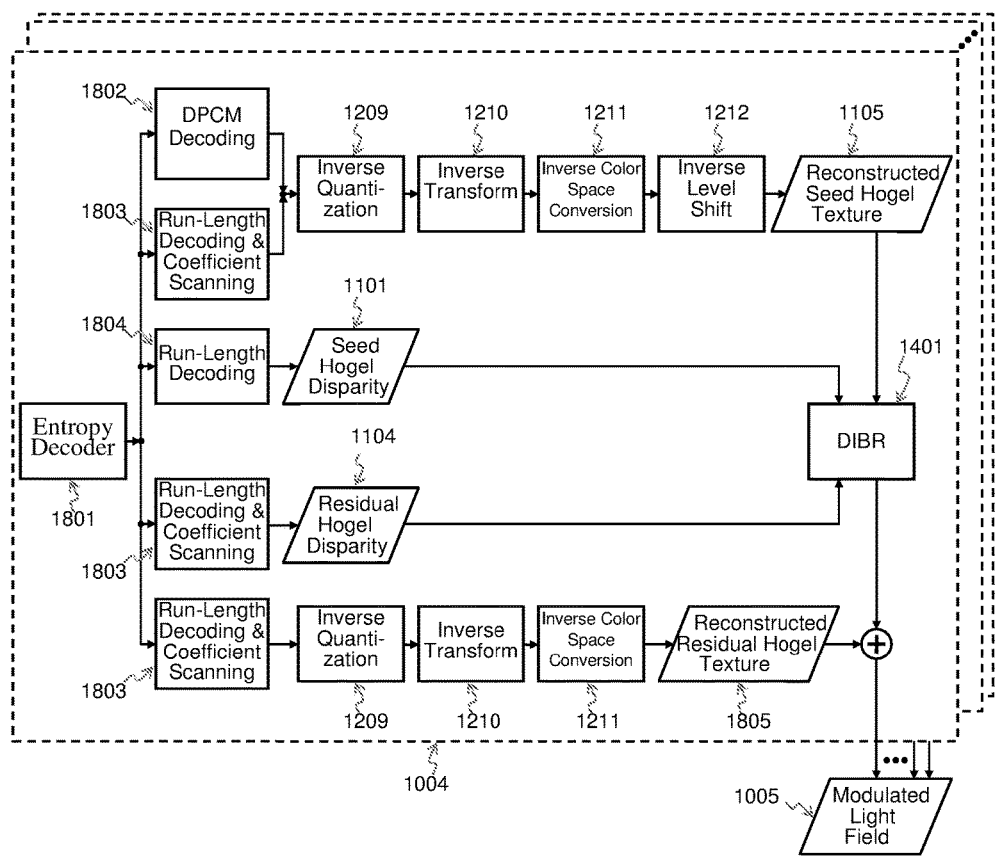
FIG. 18 illustrates the decoding of the received bit stream at the display side of the 3D imaging system of this invention.

FIG. 18 illustrates the decoding flow of the bitstream received at the light field display and provides more details on the capture-matched decoder 1004. One of the main virtues of the capture-matched decoder of this invention is that the light field display receives the compressed bitstream and decodes the bitstream to reconstruct the light field directly. Direct decoding is feasible because the hogel compression of this invention is made to match the computational capacity available at the display side for hogel decompression. Multiple decoders 1004 at the display side receive the bitstream and perform the processing only in the compressed domain to reconstruct the light field while avoiding the use of expanded data approach used in conventional decompression techniques. With multiple decoders 1004 running in parallel, each decoder is responsible for the reconstruction of only a part of the total light field to ensure adequate processing power for the reconstruction of the entire light field. The light field display receives the encoded bitstream and first performs entropy decoding 1801. The bitstream is typically packetized using headers that identify the type of packet and the coordinates of the related hogel on the display surface. The decoder 1004 analyzes the received headers and decompresses only those hogels of the light field for which it is responsible. Several packet types are used to signal the diverse light field information, and four types of such packets contain actual hogel payload information that needs to be further decoded by the display; which are the seed hogel texture, the seed hogel disparity, the residual hogel texture and the residual hogel disparity. For the seed hogel texture, the inverse operation of the encoding side is performed at the light field display side, where the DC coefficient is obtained after DPCM decoding 1802, while the other coefficients are obtained after run-length decoding and scanning 1803. The received seed hogel texture data is further inverse quantized 1209, inverse transfoimed 1210, inverse color-space converted 1211 and inverse level shifted 1212 to generate the restructured seed hogel texture 1105. The received seed hogel disparity data is run-length decoded 1804 to generate the seed hogel disparity 1101. Then both the reconstructed seed hogel texture 1105 and the seed hogel disparity 1101 are kept in the display local memory. The received residual hogel disparity data is run-length decoded and scanned 1803 to generate the residual hogel disparity 1104. The received residual hogel texture data is run-length decoded 1803, scanned 1803, inverse quantized 1209, inverse transformed 1210 and inverse color space converted 1211 generating the residual hogel texture 1805. The DIBR block 1401 takes the seed hogel disparity 1101 and forward projects it to the residual hogel position. The received residual hogel disparity 1104 can correct errors in this operation. The resulting hogel disparity is used to backward project the saved reconstructed seed hogel texture 1105 to the residual hogel position. This texture is complimented by the reconstructed residual texture 1805. The combined texture is a subset of the display's modulated pixels 1005. It should be noted that in the preceding decoding flow, the DIBR block uses only one single seed hogel for a minimal use of memory at the display; alternatively multiple seed hogels can also be used in conjunction with an MR-DIBR process, as described earlier.

Dynamic Compressed Light Field Display—

When the light field varies over time to reproduce motion of the objects within the light field, then it is referred to as a light field movie or dynamic light field. In a dynamic light field, it would be typical to assume that the light field is amenable to compression due to the presence of one or more of the following characteristics: spatial correlation (objects are smooth), temporal correlation (objects' motion is slow relative to the light field refresh rate), angular correlation (objects are somewhat similar when viewed from different angles). State of the art compression techniques exploit the redundancy in the image data to represent it using fewer bits. Spatial and temporal correlations are two commonly exploited characteristics in image video compression. By means of prediction (intra prediction and motion estimation), the redundancy present in the data due to spatial and temporal correlation is reduced, consequently the residual information (that is, the difference between the original and the predicted signal) can be coded with fewer bits, and compression is achieved. A common approach to lossy residual encoding is to apply the paradigm of transform-quantize-encode, which reduces the entropy of the signal through quantization to achieve higher compression at the entropy coding stage, nevertheless incurring loss of signal quality. Most compression algorithms exploit the characteristics of the Human Visual System (HVS) to introduce quality losses that is not perceived by the viewers. In the case of dynamic 3D data, the similarities between views are taken into account. Inter-view correlation allows the current view to be predicted from a view previously coded, a process called disparity estimation. More recently, 3D video compression techniques use concepts of computer graphics rendering to generate prediction of neighboring views from neighboring texture and depth values (view synthesis prediction) and achieve higher compression of multiview images [31]. In order to use prediction and reduce signal redundancy, memory is needed to store the reference data.

Complex prediction schemes could complicate the encoder/decoder architecture, increasing the requirements for memory, and possibly creating dependencies between the encoding/decoding blocks that could hinder parallel processing implementation unless certain design provisions are incorporated into the compressed rendering and display-matched processes. In one possible embodiment of this invention the parallel processing nodes (PNs) of the compressed rendering and the display-matched encoder of this invention are implemented in a hierarchy of multiple tiers instead of a single tier as described earlier, also called hierarchical compression. Such a generalization of the compressed rendering and the display-matched encoder of this invention would allow data connectivity between clusters of PNs similar to the inter-node connectivity within each cluster of PNs. Such PN cluster data connectivity can be achieved at higher parallel processing tier in the compressed domain to avoid excessive need for memory. In one aspect of embodiment, the temporal variations between the dynamic light field refresh cycles could be encoded using index shifted display-matched encoded hogels that are sent to light field display tier from a higher processing tier in successive dynamic light field refresh cycle. In another aspect of this embodiment, the reference hogel selection process of the compressed rendering process of this invention is re-examined in each of the dynamic light field refresh cycles and reference hogels are deleted or added to reflect temporal variation in the light field between successive refresh cycles. When a certain metric is exceeded, syntheses of the affect light field regions are repeated to account for the temporal change between successive refresh cycles. The hierarchical structure can be replicated at the decoder side, similar to the encoder hierarchical architecture. With high parallel processing tiers, processing nodes could share data, such as seed hogels, which would allow hierarchical decompression of data and an even further reduction in data rate.

Figure 19:
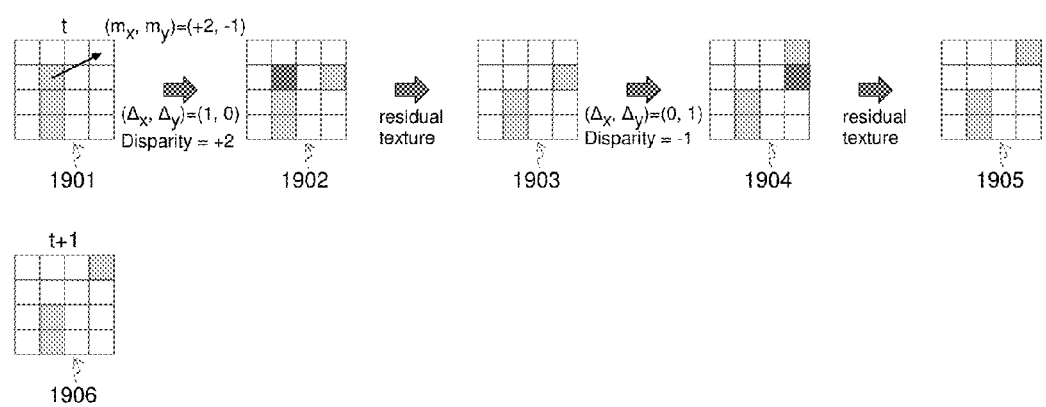
FIG. 19 illustrates details of motion compensation performed for a dynamic light field implementation of the 3D imaging system of this invention.

This invention also includes encoding methods that compress a dynamic light field using temporal correlation tools. For example, but not limited to, this invention may use techniques such as motion estimation and motion compensation for hogel data. One way to reduce the hardware footprint in a dynamic light field implementation of the invention is to reuse hardware elements to implement similar functions. For example, Motion Compensation (MC) and Depth Image-Based Rendering (DIBR) can be implemented using the same hardware, with some adaptations to the signal flow. The DIBR hardware component is responsible for moving hogel texture data to new positions according to a provided displacement value, determined by the per pixel disparity value and a given scaling factor. As explained earlier, the disparity value is multiplied by the distance between the seed and the target hogels, and this value serves as an addressing scheme for reading the seed's texture and to use it as a prediction for the target hogel. This operation bares many similarities with the motion compensation technique, which uses motion vectors as addressing pointers to a temporal reference texture (usually a frame coded in the past), that is then used as prediction for the current signal. Therefore, in one embodiment of this invention, the implementation of motion compensation in a dynamic light field would make use of the available DIBR processing blocks described earlier as part of this invention, where at first the light field objects' motion, interpreted as the variation from one light field refresh period to the next, is split into vertical and horizontal components, as illustrated in FIG. 19. For performing light field motion compensation on a light field data block 1906 at the light field refresh time t+1, the light field data block 1901 obtained at the light filed refresh time t is used as the seed hogel (see earlier discussion on the definition and use of a seed hogel within the context of this invention). Since in this case the target hogel is the hogel at the same position, only at a different light field refresh time, the distance between seed and target hogel is artificially changed from (0,0) to (1,0), in order to perform horizontal motion compensation of the seed hogel. Notice that the former position of that block may need to receive a new texture, which can be achieved by sending residual texture blocks 1903. Next, the same procedure is repeated 1904, this time receiving the vertical components of the motion vectors, and artificially modifying the distance between seed and target hogel in the DIBR processing block from (0,0) to (0,1). At last, the remaining residual texture is processed 1905, and the resulting block is the motion compensated seed reference. The described implementation of dynamic light field motion compensation may result in sending more residual information than conventional motion compensation, since the block displacement needs to be done in two steps. However, the savings in the hardware implementation may justify the loss in compression performance. In an alternative embodiment of this invention the contemplated more complex hardware implementation would be capable of performing the described dynamic light field motion compensation by performing the horizontal and vertical movements compensation at the same time in parallel utilizing the same DIBR hardware blocks used for seed and target hogels encoding and decoding, provided the display possesses the appropriate frame buffer.

With the improvement in speed processing, another way to cope with the huge amount of data is to temporarily multiplex the incoming data stream, and process a smaller subset of the data sequentially. In order to represent the angular information, spatial multiplexing would need to be applied. The processing of these pixels can be ordered according to the angular information as well, and the Field of View of the display can be divided so that a smaller set of angular information is processed at a time. Ref [32, 33] describe a light field modulator that constructs the light field by temporally modulating angular segments of the light. In such a light field modulator the segmentation of the light field is used to enable maximum light field angular extent, or field of view (FOV), as well as angular resolution using minimum modulation surface spatial footprint. Achieving maximum FOV and angular resolution using minimum modulation surface spatial footprint is critical for achieving high definition VAC-free full parallax 3D viewing experience.

One embodiment of this invention makes use the light field segmentation of the light field modulator described in Ref [32, 33] to implement the light field compressed rendering and display-matched compression of this invention. Ref [32, 33, 36] describe methods of time multiplexing the light field data by rotations (articulation) and translations (movement of the light field emitter and/or photo-diode array) of the light field imaging system. In a light field display system that uses methods described in Ref [32, 33, 36], it is possible to do all the compression methods of this invention in a time multiplexed way, from capture to display. This allows more efficient use of the capture and display system resources by reusing display pixels, memory and compressed light field data etc. and can achieve increased FOV, and/or increased resolution in addition to other benefits described in Ref [32, 33, 36]. The benefits of applying the light field compression methods of this invention within the context of the light field modulator described in Ref [32, 33] are: (1) the light field segmentation of the light field of Ref [32, 33] divides the light field into "multiplexing segments" whereby each such segment would contain a fair amount of intra-segment correlation that can be taken advantage of in the compressed rendering and display-matched compression of this invention; (2) the light field segmentation of Ref [32, 33] naturally divides the full light field into hogel modulation groups that could be directly used as the light field partitioning applied within the context of this invention to select the compressed rendering reference hogels area and the display-matched compression decoding seed hogel grouping; (3) the temporal multiplexing of the light field of Ref [32, 33] allows efficient sequential use of the decoder resources of the display-matched compression of this invention; and (4) the light field segmentation of Ref [32, 33] naturally divides the full light field into hogel modulation groups that could be directly used as the bases for the described parallel implementation of the compressed rendering and display-matched compression of this invention.

Those skilled in the art will readily appreciate that various modifications and changes can be applied to the embodiments of the invention without departing from its scope defined in and by the appended claims. It should be appreciated that the foregoing examples of the invention are illustrative only, and that the invention can be embodied in other specific forms without departing from the spirit or essential characteristics thereof. For example, while the use of linear interpolation has been described for backward warping as illustrated in FIG. 9 of the explained embodiments, other types of interpolation, such as quadratic or cubic, can also be employed to provide improved accuracy in the interpolated image. The disclosed embodiments, therefore, should not be considered to be restrictive in any sense. The scope of the invention is indicated by the appended claims, rather than the preceding description, and all variations which fall within the meaning and range of equivalents thereof are intended to be embraced therein.

What is claimed is:

1. A method for light field imaging systems comprising:
selecting, by a compressed capturing system, reference hogels from a plurality of light field hogels that represent input light field data of a scene by performing a visibility test to determine one or more cameras from a camera array used to capture the input light field data, the reference hogels being a subset of the plurality of light field hogels;
generating, by the compressed capturing system, reference hogel texture and an associated depth map for the selected reference hogels;
converting, by the compressed capturing system, the associated depth map to a disparity map; and
transmitting, by the compressed capturing system, the reference hogel texture and the disparity map to a display of a light field imaging system for modulation of a light field at the display;
wherein performing the visibility test comprises:
calculating a metric criterion for each of the plurality of light field hogels,
dividing the plurality of light field hogels into one or more hogel areas, each of the one or more hogel areas having a representative hogel selected and added to a list of reference hogels,
adding corner hogels to the list in response to determining that the corner hogels are not previously added to the list, and
adding one or more additional hogels to the list, wherein the one or more additional hogels are uncorrelated to the representative hogel within each hogel area.

2. The method of claim 1, further comprising:
receiving, by the display, the reference hogel texture and the disparity map;
synthesizing, by the display, reconstructed light field texture and reconstructed light field disparity using the reference hogel texture and the disparity map; and
modulating, by the display, the light field at the display using the synthesized light field texture and synthesized light field disparity.

3. The method of claim 1, wherein prior to transmitting the reference hogel texture and the disparity map, filtering the reference hogel texture to remove high frequency content from the reference hogel texture.

4. The method of claim 2, wherein synthesizing the reconstructed light field texture and the reconstructed light field disparity is performed using multiple-reference depth-image based rendering (MR-DIBR) algorithm.

5. The method of claim 3, wherein filtering the reference hogel texture is performed using adaptive texture filtering.

6. The method of claim 1, wherein converting the associated depth map to the disparity map is performed based on distances between adjacent reference hogels.

7. The method of claim 2, further comprising formatting the reference hogel texture and the disparity map into a bitstream that reduces data bandwidth for transmission to the display.

8. The method of claim 7, wherein formatting the reference hogel texture and the disparity map into the bitstream comprises:
generating seed hogel texture and residual hogel texture based on the synthesized light field texture, and
generating seed hogel disparity and residual hogel disparity based on the synthesized light field disparity.

9. The method of claim 8, wherein formatting the synthesized light field texture and the synthesized light field disparity into the bitstream further comprises:
encoding by a first encoder the seed hogel disparity,
encoding by a second encoder the seed hogel texture,
encoding by a third encoder the residual hogel texture,
encoding by a fourth encoder the residual hogel disparity, and
aggregating the encoded seed hogel disparity, encoded seed hogel texture, residual hogel texture, and residual hogel disparity to produce the bitstream.

10. A method for light field imaging systems comprising:
selecting, by a compressed capturing system, reference hogels from a plurality of light field hogels that represent input light field data of a scene, the reference hogels being a subset of the plurality of light field hogels;
generating, by the compressed capturing system, reference hogel texture and an associated depth map for the selected reference hogels;
converting, by the compressed capturing system, the associated depth map to a disparity map; and
transmitting, by the compressed capturing system, the reference hogel texture and the disparity map to a display of a light field imaging system for modulation of a light field at the display;
wherein converting the associated depth map to the disparity map is performed using a conversion method as follows:

$$\text{disparity} = \left\lfloor \delta \times \frac{f \times P}{\text{Depth} \times pp} + 0.5 \right\rfloor + \frac{\text{depth}}{|\text{depth}|} \text{ if depth} \neq 0$$

$$\text{disparity} = 0 \text{ if depth} = 0,$$

wherein $\delta$ is a disparity value quantization precision in bits, pp is a hogel pixel pitch, P is a hogel spacing, and f is a focal length of a camera representing a hogel.

11. A light field imaging system, comprising:
a compressed capturing system configured to:
select reference hogels from a plurality of light field hogels that represent input light field data of a scene, the reference hogels being a subset of the plurality of light field hogels,
generate reference hogel texture and an associated depth map for the selected reference hogels,
convert the associated depth map to a disparity map, and
transmit the reference hogel texture and the disparity map for modulation of a light field;
wherein to select the reference hogels from the plurality of light field hogels, the compressed capturing system is further configured to perform a visibility test to determine one or more cameras from a camera array used to capture the input light field data;

wherein to perform the visibility test, the compressed capturing system is further configured to
  calculate a metric criterion for each of the plurality of light field hogels,
  divide the plurality of light field hogels into one or more hogel areas, each of the one or more hogel areas having a representative hogel selected and added to a list of reference hogels,
  add corner hogels to the list in response to determining that the corner hogels are not previously added to the list, and
  add one or more additional hogels to the list, wherein the one or more additional hogels are uncorrelated to the representative hogel within each hogel area; and a display configured to:
  receive the reference hogel texture and the disparity map;
  synthesize reconstructed light field texture and reconstructed light field disparity using the reference hogel texture and the disparity map; and
  modulate the light field at the display using the synthesized light field texture and synthesized light field disparity.

12. The light field imaging system of claim 11, wherein prior to transmitting the reference hogel texture and the disparity map, the compressed capturing system is further configured to filter the reference hogel texture to remove high frequency content from the reference hogel texture.

13. The light field imaging system of claim 11, wherein to synthesize the reconstructed light field texture and the reconstructed light field disparity, the compressed capturing system is further configured to perform a multiple-reference depth-image based rendering (MR-DIBR) algorithm.

* * * * *